United States Patent
Dalla Libera et al.

(10) Patent No.: US 11,007,645 B2
(45) Date of Patent: May 18, 2021

(54) MOBILE ROBOT AND CONTROL METHOD

(71) Applicant: Panasonic Intellectual Property Management Co., Ltd., Osaka (JP)

(72) Inventors: Fabio Dalla Libera, Osaka (JP); Yuko Tsusaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 16/458,847

(22) Filed: Jul. 1, 2019

(65) Prior Publication Data
US 2020/0009733 A1  Jan. 9, 2020

(30) Foreign Application Priority Data
Jul. 6, 2018  (JP) .............................. JP2018-129383

(51) Int. Cl.
*B25J 9/16* (2006.01)
*G05D 1/02* (2020.01)

(52) U.S. Cl.
CPC ........... *B25J 9/1666* (2013.01); *B25J 9/1694* (2013.01); *G05D 1/0212* (2013.01); *G05D 1/0257* (2013.01)

(58) Field of Classification Search
CPC ..... B25J 9/1666; B25J 9/1694; G05D 1/0257; G05D 1/0212
USPC .......... 700/245, 255; 15/319; 701/1, 23, 400
See application file for complete search history.

(56) References Cited

U.S. PATENT DOCUMENTS

| | | | |
|---|---|---|---|
| 2015/0223659 A1* | 8/2015 | Han | G05D 1/0274 134/18 |
| 2017/0100007 A1 | 4/2017 | Matsumoto et al. | |
| 2017/0265703 A1* | 9/2017 | Park | A47L 9/28 |
| 2018/0284786 A1* | 10/2018 | Moshkina-Martinson | A47L 9/2894 |
| 2018/0317725 A1* | 11/2018 | Lee | A47L 9/2826 |
| 2019/0188477 A1* | 6/2019 | Mair | G01C 21/206 |

FOREIGN PATENT DOCUMENTS

WO  2016/002186  1/2016

* cited by examiner

*Primary Examiner* — Dalena Tran
(74) *Attorney, Agent, or Firm* — Wenderoth, Lind & Ponack, L.L.P.

(57) ABSTRACT

A cleaning device includes: a range finding sensor; an acquisition unit which acquires a map of an environment including object position information, and a first path where the cleaning device is to move in the environment; an identification unit which identifies a first path partial path; a converter which converts the partial path into a differently-shaped path to generate a second path; and a motor controller which causes the cleaning device to move along the second path. The identification unit sets a region, on the map, where the range finding sensor can perform range finding from start and end points of a portion of the first path, and identifies the portion as the partial path when only one or more straight lines which traverse the region and are parallel to a line segment toward the end point from the start point are represented as the object in the region set.

9 Claims, 23 Drawing Sheets

MOBILE ROBOT AND CONTROL METHOD

CROSS REFERENCE TO RELATED APPLICATION

This application claims the benefit of priority of Japanese Patent Application Number 2018-129383 filed on Jul. 6, 2018, the entire content of which is hereby incorporated by reference.

BACKGROUND

1. Technical Field

The present disclosure relates to a mobile robot, and a control method.

2. Description of the Related Art

Conventionally, an autonomous travel type cleaning device is disclosed which autonomously travels on a cleaning surface in order to suck in dust present on the cleaning surface (see International Publication No. WO2016/002186).

SUMMARY

However, a mobile robot, such as a conventional autonomous travel type cleaning device, has room for improvement with respect to setting of a movement path.

In view of the above, one aspect of the present disclosure provides a mobile robot which can move along a more appropriate movement path.

A mobile robot according to an aspect of the present disclosure is a mobile robot which moves in an environment and includes: a range finding sensor; an acquisition unit which acquires a map of the environment as viewed from above and a first path, the map including position information of an object, the first path being a path along which the mobile robot is to move in the environment; an identification unit which identifies a partial path forming a portion of the first path; a converter which converts the partial path, identified by the identification unit, into a path having a shape different from a shape of the partial path, to generate a second path; and a drive unit which causes the mobile robot to move along the second path, wherein the identification unit: sets a region, on the map, where range finding is performable by the range finding sensor from both of a start point and an end point of the portion of the first path; and identifies the portion as the partial path when only one or more straight lines are represented as the object which is present in the region set, the one or more straight lines traversing the region and being parallel to a line segment directed to the end point from the start point.

Generic and specific aspects may be implemented using a system, a method, an integrated circuit, a computer program, or a computer-readable recording medium, such as a CD-ROM. Alternatively, the aspect may be implemented by any combination of systems, methods, integrated circuits, computer programs, and recording mediums.

A mobile robot of an aspect of the present disclosure can move along a more appropriate movement path.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENTS

Figure 1:
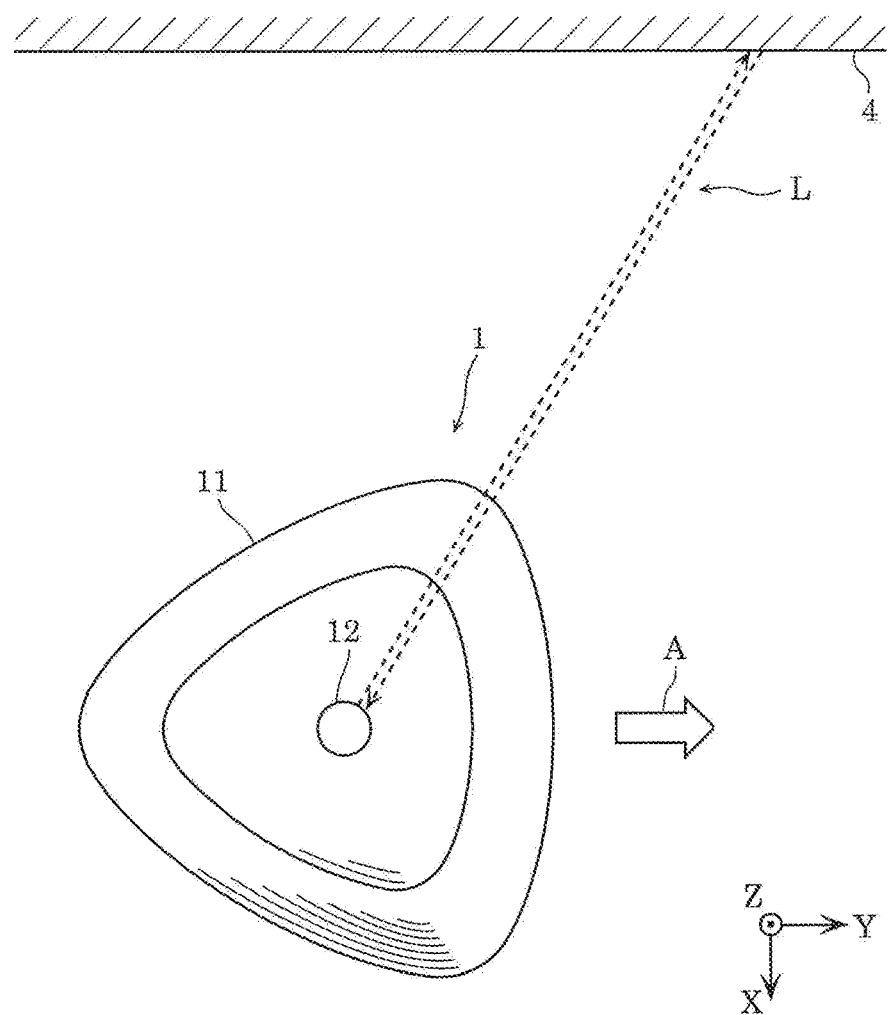
FIG. 1 is a top plan view schematically showing the external appearance of a cleaning device according to Embodiment 1.

A mobile robot according to an aspect of the present disclosure is a mobile robot which moves in an environment and includes: a range finding sensor; an acquisition unit which acquires a map of the environment as viewed from above and a first path, the map including position information of an object, the first path being a path along which the mobile robot is to move in the environment; an identification unit which identifies a partial path forming a portion of the first path; a converter which converts the partial path, identified by the identification unit, into a path having a shape different from a shape of the partial path, to generate a second path; and a drive unit which causes the mobile robot to move along the second path. The identification unit: sets a region, on the map, where range finding is performable by the range finding sensor from both of a start point and an end point of the portion of the first path; and identifies the portion as the partial path when only one or more straight lines are represented as the object which is present in the region set, the one or more straight lines traversing the region and being parallel to a line segment directed to the end point from the start point.

If the mobile robot moves along the first path, the distance to objects around the mobile robot does not vary and hence, self-position estimation is not appropriately performed. However, with the above-mentioned configuration, when self-position estimation is not appropriately performed, a movement path is changed to a path different from the first path. With such a change, the distance to the objects around the mobile robot varies when the mobile robot moves and hence, self-position estimation is appropriately performed. Accordingly, the mobile robot can move along a more appropriate movement path.

Furthermore, the second path may be a path which connects a start point and an end point of the partial path, and which includes no straight line portion parallel to the line segment.

With such a configuration, the mobile robot changes the movement path from the first path to the second path which is formed such that the distance to objects around the mobile robot varies when the mobile robot moves. In the case where the mobile robot moves parallel to a straight line indicating an object on the map, the distance to the objects around the mobile robot does not vary when the mobile robot moves. Accordingly, self-position estimation is not appropriately performed by the mobile robot. In view of the above, as described above, the path along which the mobile robot is to move parallel to a wall is prevented from being included in the second path, thus allowing self-position estimation to be appropriately performed.

Furthermore, the second path may be a path which connects the start point and the end point of the partial path in a zigzag manner.

With such a configuration, the mobile robot changes the movement path from the first path to the zigzag shaped second path formed such that the distance to objects around the mobile robot varies when the mobile robot moves. Accordingly, the mobile robot can easily generate the second path along which self-position estimation can be performed and hence, the mobile robot can move along a more appropriate movement path.

Furthermore, in identifying the partial path to be converted by the converter, the identification unit may: set, for each partial path forming the first path, a plurality of imaginary straight lines parallel to a straight line which connects a start point and an end point of the partial path at predetermined intervals in the region with respect to the partial path; and identify the partial path as the partial path to be converted by the converter when, with respect to each of the plurality of imaginary straight lines, the map shows that an object is present at all points on the imaginary straight line, or the map shows that an object is not present on any of points on the imaginary straight line.

With such a configuration, the mobile robot easily determines whether or not it is necessary to change a path based on the positions of objects around the mobile robot. Accordingly, the mobile robot can move along a more appropriate movement path due to appropriate self-position estimation.

Furthermore, the acquisition unit may further acquire a third path generated based on the map, the drive unit may further cause the mobile robot to move along the third path, and the third path may include (a) a fourth path along which the mobile robot is to move in a zigzag manner from a start point of the third path along a peripheral edge portion of a movable region on the map where the mobile robot is capable of moving, (b) a fifth path along which the mobile robot is to move in a zigzag manner from an end point of the fourth path along a portion of the movable region excluding the peripheral edge portion, and (c) a sixth path along which the mobile robot is to move in a zigzag manner from an end point of the fifth path to an end point of the third path.

With such a configuration, the mobile robot moves along the third path generated independently from the second path. The second path generated by the mobile robot may have problems depending on the shape of the region where the mobile robot is capable of moving. The problem may be that a large amount of time is required for movement of the mobile robot, or that the second path has a large amount of overlapping portions. In such a case, the mobile robot moves along the third path generated independently from the second path and hence, the above-mentioned problem may be avoided.

Furthermore, the mobile robot may further include a selector which compares the number of times the mobile robot changes direction when the mobile robot travels along the second path and the number of times the mobile robot changes direction when the mobile robot travels along the third path to select one of the second path and the third path where the number of times the mobile robot changes direction is fewer. The drive unit may cause the mobile robot to move along the one of the second path and the third path selected by the selector.

With such a configuration, the mobile robot can select either one of the second path or the third path which requires less time for movement by comparing the second path and the third path with each other. Accordingly, the mobile robot can reduce time required for movement. At the same time, the mobile robot can move along a more appropriate movement path due to appropriate self-position estimation.

A mobile robot according to an aspect of the present disclosure is a mobile robot which moves in an environment and includes: a range finding sensor; and a drive unit which causes the mobile robot to move. In causing the mobile robot to move along a movement path parallel to a planar portion in a vicinity of a wall having the planar portion and an end edge portion, the drive unit: (a) causes the mobile robot to move parallel to the planar portion when the planar portion and the end edge portion are present in a region where range finding is performable by the range finding sensor, and (b) causes the mobile robot to move along a zigzag shaped movement path converted from the movement path when only the planar portion from the planar portion and the end edge portion is present in the region where range finding is performable by the range finding sensor.

With such a configuration, it is possible to obtain advantageous effects substantially equal to the advantageous effects obtained by the above-mentioned mobile robot.

A method for controlling a mobile robot according to an aspect of the present disclosure is a method for controlling a mobile robot which moves in an environment and includes a range finding sensor, the method including: acquiring a map of the environment as viewed from above and a first path, the map including position information of an object, the first path being a path along which the mobile robot is to move in the environment; identifying a partial path forming a portion of the first path; converting the partial path identified into a path having a shape different from a shape of the partial path, to generate a second path. In the identifying, a region where range finding is performable by the range finding sensor from both of a start point and an end point of the portion of the first path is set on the map, and the portion is identified as the partial path when only one or more straight lines are represented as the object which is present in the region set, the one or more straight lines traversing the region and being parallel to a line segment directed to the end point from the start point.

With such a configuration, it is possible to obtain advantageous effects substantially equal to the advantageous effects obtained by the above-mentioned mobile robot.

A method for controlling a mobile robot according to an aspect of the present disclosure is a method for controlling a mobile robot which moves in an environment and includes a range finding sensor, the method including, in causing the mobile robot to move along a movement path parallel to a planar portion in a vicinity of a wall having the planar portion and an end edge portion: (a) causing the mobile robot to move parallel to the planar portion when the planar portion and the end edge portion are present in a region where range finding is performable by the range finding sensor; and (b) causing the mobile robot to move along a zigzag shaped movement path converted from the movement path when only the planar portion from the planar portion and the end edge portion is present in the region where range finding is performable by the range finding sensor.

With such a configuration, it is possible to obtain advantageous effects substantially equal to the advantageous effects obtained by the above-mentioned mobile robot.

These generic and specific aspects may be implemented using a system, a method, an integrated circuit, a computer program, or a computer-readable recording medium, such as a CD-ROM. Alternatively, the aspect may be implemented by any combination of systems, methods, integrated circuits, computer programs, and recording mediums.

Hereinafter, Embodiments are specifically described with reference to drawings.

Each of Embodiments described below shows a general or specific example. The numerical values, shapes, materials, constitutional elements, the arrangement position and connection mode of the constitutional elements, steps, the order of the steps and the like described in Embodiments below are only examples, and are not intended to limit the present disclosure. Further, among the constitutional elements in Embodiments below, constitutional elements not described in the independent claims indicating the most generic concept are described as arbitrary constitutional elements.

Embodiment 1

In this embodiment, the description is made with respect to cleaning device 1 as a mobile robot which can move along a more appropriate movement path. The mobile robot can be also used not only as cleaning device 1, but also as a mobile robot for performing various sensing, a transport robot which transports products, a communication robot which communicates with humans or the like. A movement path is also simply referred to as "path".

Figure 2:
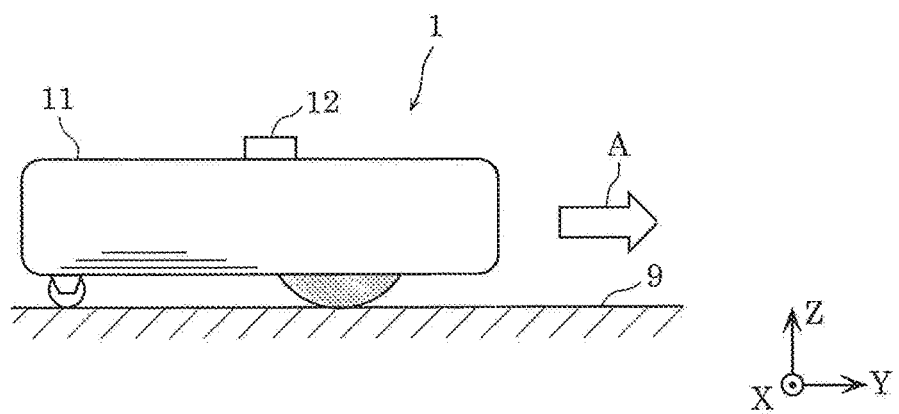
FIG. 2 is a side view schematically showing the external appearance of the cleaning device according to Embodiment 1.

FIG. 1 and FIG. 2 are respectively a top plan view and a side view schematically showing the external appearance of cleaning device 1 of this embodiment. The operation of cleaning device 1 is described with reference to these drawings. In the description made hereinafter, the description may be made using an X coordinate axis, a Y coordinate axis, and a Z coordinate axis which are shown in the respective drawings. A plus direction in the Z axis is also referred to as an upward direction.

Cleaning device 1 autonomously travels on cleaning surface 9 in an environment in order to clean cleaning surface 9. Cleaning device 1 autonomously decides a movement path for cleaning device 1, and sucks in dust and the like present on cleaning surface 9 while moving along the decided movement path. One example of the environment may be an indoor space including a space in housing, office buildings, or commercial buildings. The movement path of cleaning device 1 may be decided by performing self-position estimation and by forming a map using SLAM technology (Simultaneous Localization and Mapping). For example, cleaning device 1 measures the distance to objects around cleaning device 1, such as wall 4, using light L, and performs a comparison with a map which cleaning device 1 contains. With such operations, the position of cleaning device 1 on the map is estimated and, further, a new portion of the map is formed. A control is performed so as to allow cleaning device 1 to move along the movement path which cleaning device 1 contains based on the estimated position of cleaning device 1. Cleaning device 1 moves in principle in a direction indicated by arrow A. The term "move" may also be expressed as "advance" or "travel". Further, the direction indicated by arrow A may also be expressed as "moving direction", "advancing direction", or "traveling direction".

There is a problem that even when cleaning device 1 moves, self-position estimation is not appropriately performed depending on the distance to objects around cleaning device 1. A case where such a problem is caused, and a case where such a problem is not caused are described by giving examples.

Figure 3:
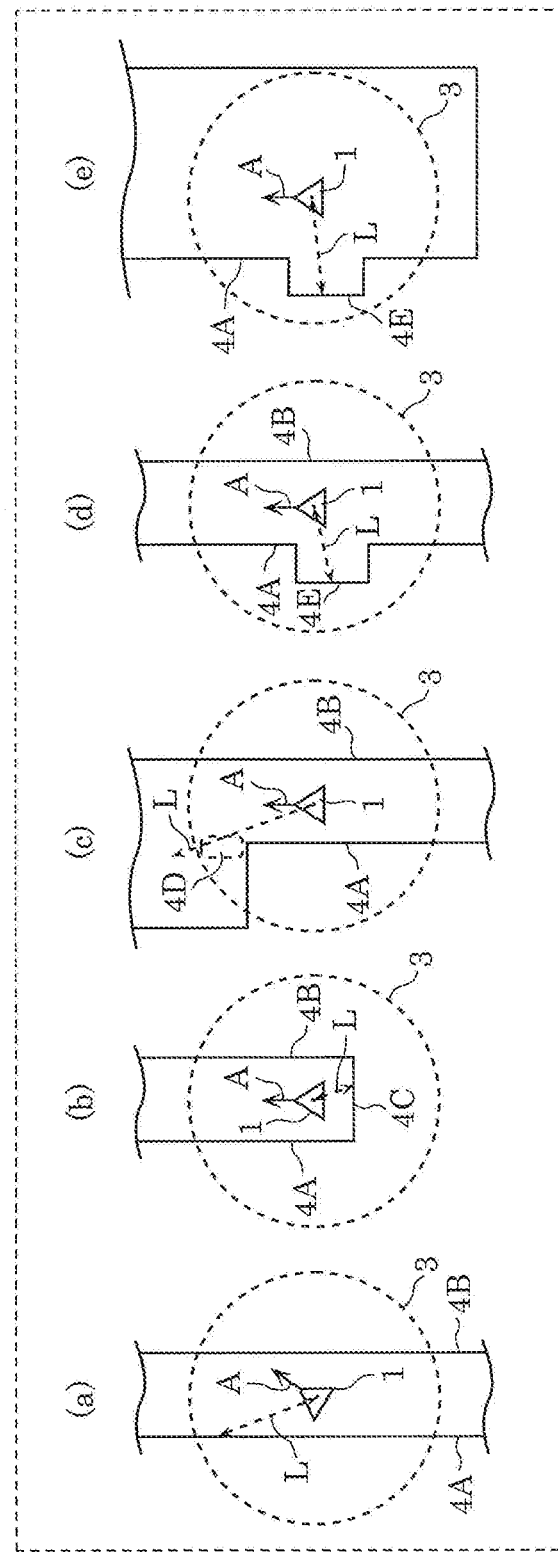
FIG. 3 is a first explanatory view showing the positional relationship between the cleaning device according to Embodiment 1 and objects around the cleaning device.

FIG. 3 is an explanatory view showing the positional relationship between cleaning device 1 of this embodiment and objects around cleaning device 1. FIG. 3 shows cleaning device 1 and an area around cleaning device 1 as viewed in a top plan view. The moving direction of cleaning device 1 is indicated by arrow A. A region where the distance to objects around cleaning device 1 can be measured by cleaning device 1 using light L is indicated as region 3. In FIG. 3, objects around cleaning device 1 are walls 4A, 4B, . . . , 4E. The objects around cleaning device 1 may be obstacles around cleaning device 1.

Each of (a) to (e) in FIG. 3 shows an example where self-position estimation is appropriately performed by cleaning device 1.

For example, in (a) in FIG. 3, when cleaning device 1 moves in the direction indicated by arrow A, the distance from cleaning device 1 to wall 4B decreases, while the distance from cleaning device 1 to wall 4A increases. In (b) in FIG. 3, when cleaning device 1 moves in the direction indicated by arrow A, neither the distance from cleaning device 1 to wall 4A nor the distance from cleaning device 1 to wall 4B varies, but the distance from cleaning device 1 to wall 4C increases. In (c) in FIG. 3, when cleaning device 1 moves in the direction indicated by arrow A, due to space 4D having no wall on the extension of wall 4A, there is no reflection of light L from the position of space 4D and hence, data of distance cannot be acquired. In (d) and (e) in FIG. 3, when cleaning device 1 moves in the direction indicated by arrow A, wall 4E, which is disposed at a portion recessed from wall 4A in the direction away from cleaning device 1, moves rearward relative to cleaning device 1.

As described above, when cleaning device 1 moves, the positional relationship between cleaning device 1 and objects around cleaning device 1 varies. Accordingly, self-position estimation can be appropriately performed by cleaning device 1.

Figure 4:
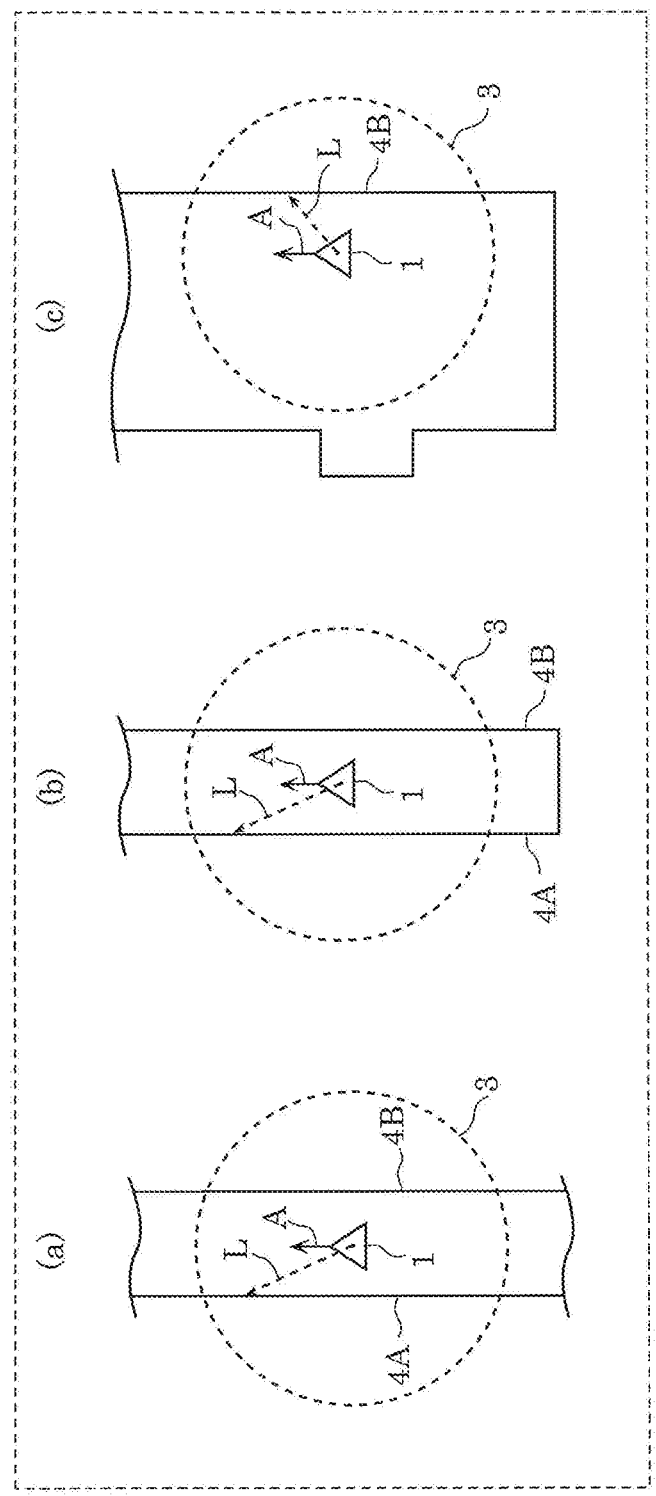
FIG. 4 is a second explanatory view showing the positional relationship between the cleaning device according to Embodiment 1 and objects around the cleaning device.

Each of (a) to (c) in FIG. 4 is a second explanatory view showing the positional relationship between cleaning device 1 of this embodiment and objects around cleaning device 1. In the same manner as (a) to (e) in FIG. 3, each of (a) to (c) in FIG. 4 shows cleaning device 1 and an area around cleaning device 1 as viewed in a top plan view, and also shows arrow A, region 3 and the like. Each of (a) to (c) in FIG. 4 shows an example where a problem occurs in self-position estimation performed by cleaning device 1.

For example, in (a) and (b) in FIG. 4, when cleaning device 1 moves in the direction indicated by arrow A, neither the distance from cleaning device 1 to wall 4A nor the distance from cleaning device 1 to wall 4B varies. Further, there are no other objects around cleaning device 1 except for walls 4A and 4B. In (c) in FIG. 4, when cleaning device 1 moves in the direction indicated by arrow A, the distance from cleaning device 1 to wall 4B does not vary. Further, there are no other objects around cleaning device 1 except for wall 4B.

As described above, even when cleaning device 1 moves, the distance from cleaning device 1 to wall 4A or the like does not vary. In other words, the position of wall 4A or the like as viewed from cleaning device 1 does not vary. Accordingly, self-position estimation which is performed by cleaning device 1 using light is not appropriately performed.

In the case where the above-mentioned movement path is planned, cleaning device 1 of this embodiment appropriately varies a movement path so as to allow self-position estimation to be appropriately performed. With such variation, cleaning device 1 appropriately performs self-position estimation and, as a result, cleaning device 1 can move along an appropriate movement path.

The detailed configuration and processing of cleaning device 1 are described hereinafter.

Figure 5:
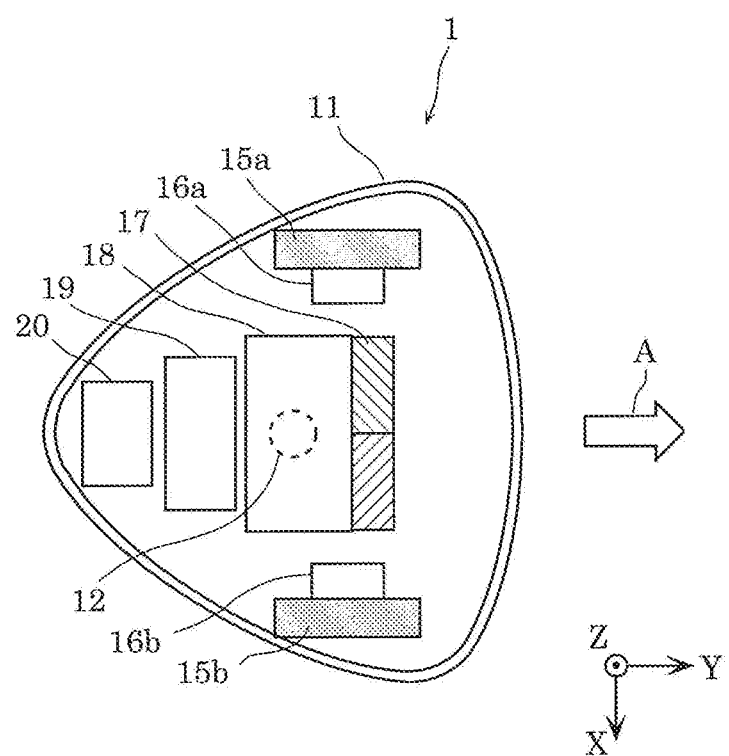
FIG. 5 is a top plan view schematically showing the internal structure of the cleaning device according to Embodiment 1.

FIG. 5 is a top plan view schematically showing the internal structure of cleaning device 1 of this embodiment.

As shown in FIG. 5, cleaning device 1 includes: casing 11; range finding sensor 12; wheels 15a and 15b; motors 16a and 16b; suction portion 17; dust box 18; control circuit 19; and power source 20.

Casing 11 is the casing of cleaning device 1, and defines the profile of cleaning device 1. Casing 11 has a substantially triangular shape as viewed in a top plan view. However, casing 11 may adopt any shape. For example, casing 11 may have any shape, such as a circular shape, a quadrangular shape, or a pentagonal shape. Further, each of the size of casing 11 in the X axis direction and the size of casing 11 in the Y axis direction is approximately 30 cm, and the size of casing 11 in the Z axis direction is approximately 10 cm, for example. However, the size of casing 11 is not limited to such sizes.

Range finding sensor 12 measures a spatial distance between objects present around cleaning device 1 and range finding sensor 12. Range finding sensor 12 may be achieved by a laser range finder or a LiDAR (Light Detection and Ranging) device which measures the distance to objects around cleaning device 1 using light, for example.

Range finding sensor 12 is disposed in an exposed manner from the upper surface of casing 11. Range finding sensor 12 includes a light emitter and a light receiver. The light emitter emits a light beam in a direction parallel to the XY plane. The light receiver receives a light beam from the direction along which the light emitter emits the light beam. The light emitter emits a light beam and the light receiver receives a light beam while the light emitter and the light receiver rotate about an axis extending parallel to the Z axis direction. With such operations, the distance to objects present around cleaning device 1 is measured. The speed of rotation may be five times in one second, for example. Range finding sensor 12 may emit light 60 times in a period of one rotation, for example. Range finding sensor 12 has a predetermined measurement distance. For example, the maximum value of the predetermined measurement distance is assumed as a first distance. The first distance varies depending on the performance of the laser range finder or the LiDAR. The first distance may be several meters or more and several hundred meters or less, for example.

Wheels 15a and 15b are wheels which cause cleaning device 1 to move. Rotary shafts of wheels 15a and 15b are fixed to casing 11, and casing 11 moves with rotations of wheels 15a and 15b. The rotation of wheel 15a and the rotation of wheel 15b are respectively controlled by motor 16a and motor 16b in an independent manner. The material for forming wheels 15a and 15b is rubber, nylon or the like.

Motor 16a and motor 16b respectively control the rotation of wheel 15a and the rotation of wheel 15b in an independent manner. Motor 16a causes wheel 15a to rotate or stop under the control performed by control circuit 19. Motor 16b causes wheel 15b to rotate or stop under the control performed by control circuit 19. Further, providing a difference in rotational speed between motor 16a and motor 16b allows cleaning device 1 to vary its direction, that is, allows cleaning device 1 to change direction. Assume that cleaning device 1 holds position of cleaning device 1 when cleaning device 1 changes direction. This is because if the position of cleaning device 1 varies at the time of changing direction, that is, if cleaning device 1 changes direction while moving, it becomes difficult for cleaning device 1 to perform self-position estimation. Motors 16a and 16b are also simply referred to as motor 16.

Suction portion 17 sucks in dust present on cleaning surface 9. Suction portion 17 sucks in dust together with air through a suction port (not shown in the drawing) disposed on the bottom surface of casing 11. Suction portion 17 also discharges sucked dust to dust box 18. The width of suction portion 17, that is, the length in the X axis direction of suction portion 17 may be approximately 15 cm, for example. However, the width of suction portion 17 is not limited to such a width. The suction operation of suction portion 17 is controlled by control circuit 19.

Dust box 18 is an accommodation space which accommodates dust, sucked by suction portion 17 together with air, in a state where dust and air are separated from each other by a filter.

Control circuit 19 controls various functions of cleaning device 1. To be more specific, control circuit 19 decides the movement path of cleaning device 1, and controls motors 16a and 16b such that cleaning device 1 moves along the decided movement path. Control circuit 19 can be achieved with the execution of a program by a processor.

In performing cleaning processing, control circuit 19 acquires distances to objects around cleaning device 1 using range finding sensor 12. Then, control circuit 19 decides the movement path of cleaning device 1 based on an SLAM technology, and controls motors 16a and 16b, thus causing cleaning device 1 to travel.

Power source 20 is a power source apparatus which supplies power to respective constitutional elements of cleaning device 1. Power source 20 may be a secondary battery, for example. To be more specific, power source 20 is a lithium ion battery.

In addition to the above-mentioned constitutional elements, cleaning device 1 may also include constitutional elements, such as a terminal to be connected to a charger for supplying power to power source 20, and a brush for sweeping together dust on cleaning surface 9.

Next, control circuit 19 is described in more detail.

Figure 6:
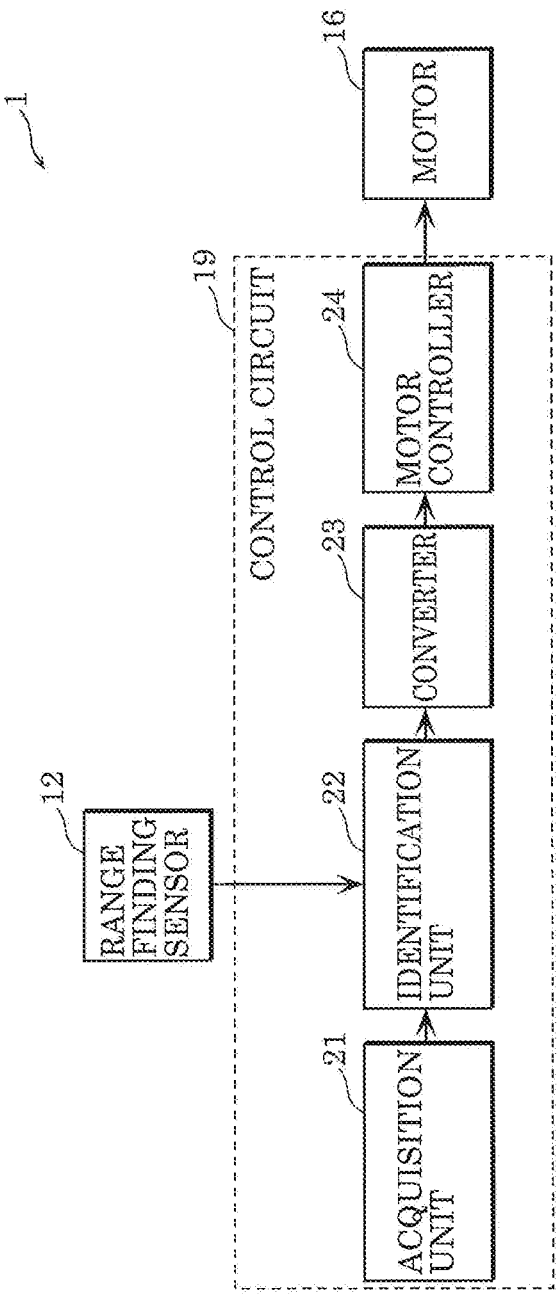
FIG. 6 is a block diagram showing the function of a control circuit of the cleaning device according to Embodiment 1 in detail.

FIG. 6 is a block diagram showing the function of control circuit 19 of cleaning device 1 of this embodiment in detail.

As shown in FIG. 6, control circuit 19 includes acquisition unit 21, identification unit 22, converter 23, and motor controller 24.

Acquisition unit 21 acquires information relating to the movement path of cleaning device 1. To be more specific, acquisition unit 21 acquires a map of an environment as viewed from above and a first path, the map including position information of objects, the first path being a path along which cleaning device 1 is to move in the environment. The map acquired by acquisition unit 21 is information showing the positions of objects present around cleaning device 1. For example, the map is information showing whether or not objects are present in respective cells obtained by dividing a region, where cleaning device 1 is capable of moving, into the cells by a grid as viewed in a top plan view. A path acquired by acquisition unit 21 is a path planned as the movement path of cleaning device 1, and is also referred to as "first path". Map information is also simply referred to as "map". Path information is also simply referred to as "path".

Identification unit 22 identifies a partial path which is a portion of the first path to be converted by converter 23. To be more specific, identification unit 22 sets a region, on the map, where range finding is performable by range finding sensor 12 from both of the start point and the end point of the portion of the first path. Identification unit 22 identifies the above-mentioned portion as a partial path when only one or more straight lines which traverse the region and are parallel to a line segment directed to the end point from the start point are represented as objects which are present in the region set.

Converter 23 converts the portion of the first path. To be more specific, converter 23 converts the partial path identified by identification unit 22 to a path having a shape different from the shape of this partial path. In this embodiment, a path converted by converter 23 is also referred to as "second path". It is also safe to say that converter 23 converts a partial path identified by identification unit 22, thus generating a new second path.

A path generated by converter 23 through conversion is a path where at least a portion of the path has a shape different from the shape of the partial path. To be more specific, the path generated by converter 23 through conversion is a path including no straight line portion which connects the start point and the end point of the above-mentioned partial path, and which is parallel to the above-mentioned straight line. For example, a path generated by converter 23 through conversion may be a path which connects the start point and the end point of the above-mentioned partial path in a zigzag manner. In this embodiment, a zigzag shaped path means a path having a shape where a straight line is bent a plurality of times. In other words, a zigzag shaped path is a path formed of a plurality of straight lines having end portions connected with each other. In other words, a zigzag shaped path may also be expressed as a line obtained by connecting a plurality of straight lines having different directions. It is also safe to say that a zigzag shaped path has a Z shape or a lightning bolt shape. Hereinafter, a case where converter 23 converts the above-mentioned partial path into a zigzag shaped path is described as one example.

Motor controller 24 is a control device which controls the driving of motor 16 based on the control performed by control circuit 19. To be more specific, motor controller 24 drives motor 16 such that cleaning device 1 moves along a second path generated by converter 23 through conversion. Motor controller 24 corresponds to a drive unit.

Figure 7:
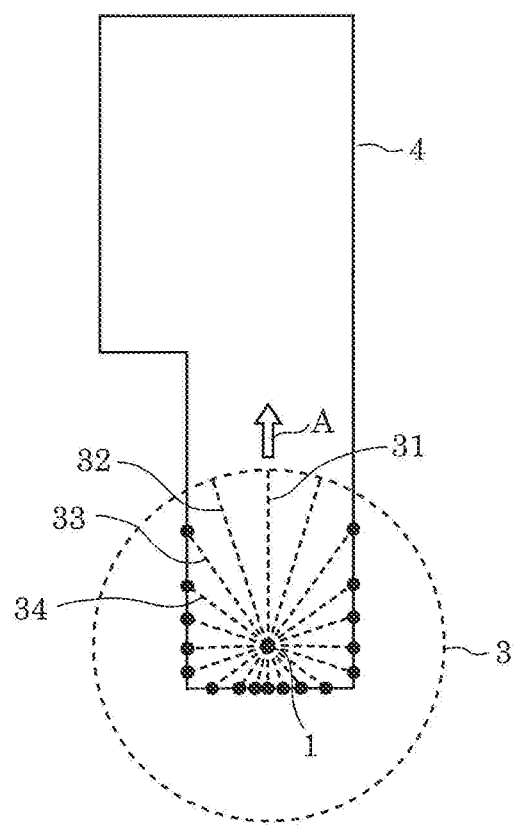
FIG. 7 is an explanatory view showing one example of a region where range finding is performable by a range finding sensor in Embodiment 1.
Figure 8:
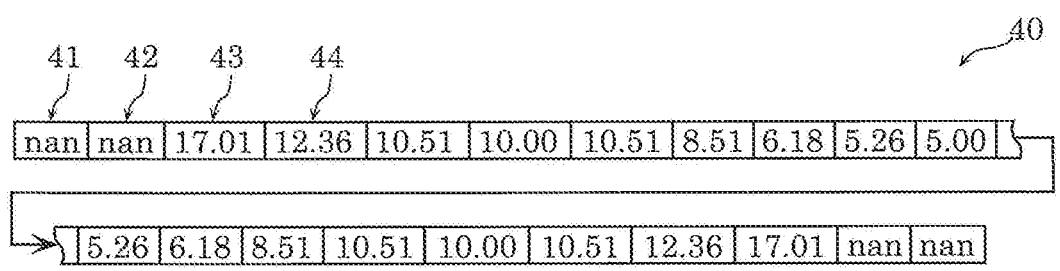
FIG. 8 is an explanatory view showing one example of results of distance measurement performed by the range finding sensor in Embodiment 1.

Next, range finding performed by range finding sensor 12 is described. FIG. 7 is an explanatory view showing one example of a region where range finding is performable by range finding sensor 12 in this embodiment. FIG. 8 is an explanatory view showing one example of results of distance measurement performed by range finding sensor 12 in this embodiment.

As shown in FIG. 7, range finding sensor 12 sequentially emits light to an area around cleaning device 1 while rotating. In this embodiment, first, range finding sensor 12 emits light in a direction parallel to the moving direction indicated by arrow A. That is, range finding sensor 12 emits light along optical path 31. Thereafter, range finding sensor 12 sequentially emits light along optical paths 32, 33 and 34 in a counterclockwise direction on the paper on which FIG. 7 is shown. In FIG. 7, region 3 is a region where range finding is performable by range finding sensor 12. The light may be emitted in a clockwise direction.

Data row 40 shown in FIG. 8 is data of distance measured by light received through optical path 31 and the like shown in FIG. 7. Data 41, 42, 43, and 44 contained in data row 40 are respectively data of distance measured by emitting light along optical paths 31, 32, 33, and 34.

Light emitted by range finding sensor 12 along optical paths 31 and 32 in FIG. 7 are not reflected in region 3 since objects, such as wall 4, are not present in region 3. Accordingly, range finding sensor 12 does not receive reflected light of light emitted along optical paths 31 and 32. As described above, range finding sensor 12 cannot acquire significant data of distance with respect to optical paths 31 and 32 and hence, data 41 and 42 show "nan", indicating no significant data of distance.

On the other hand, light outputted by range finding sensor 12 along optical paths 33 and 34 is reflected off wall 4 in region 3 so that the reflected light is received by range finding sensor 12. Range finding sensor 12 receives reflected light which moves along optical paths 33 and 34 in a direction opposite to the direction along which light is emitted. Accordingly, range finding sensor 12 acquires "17.01" and "12.36" as data of distances to objects present on the optical paths.

Processing performed by cleaning device 1 having the above-mentioned configuration is described hereinafter while specific examples of maps, movement path, and the like are shown.

Figure 9:
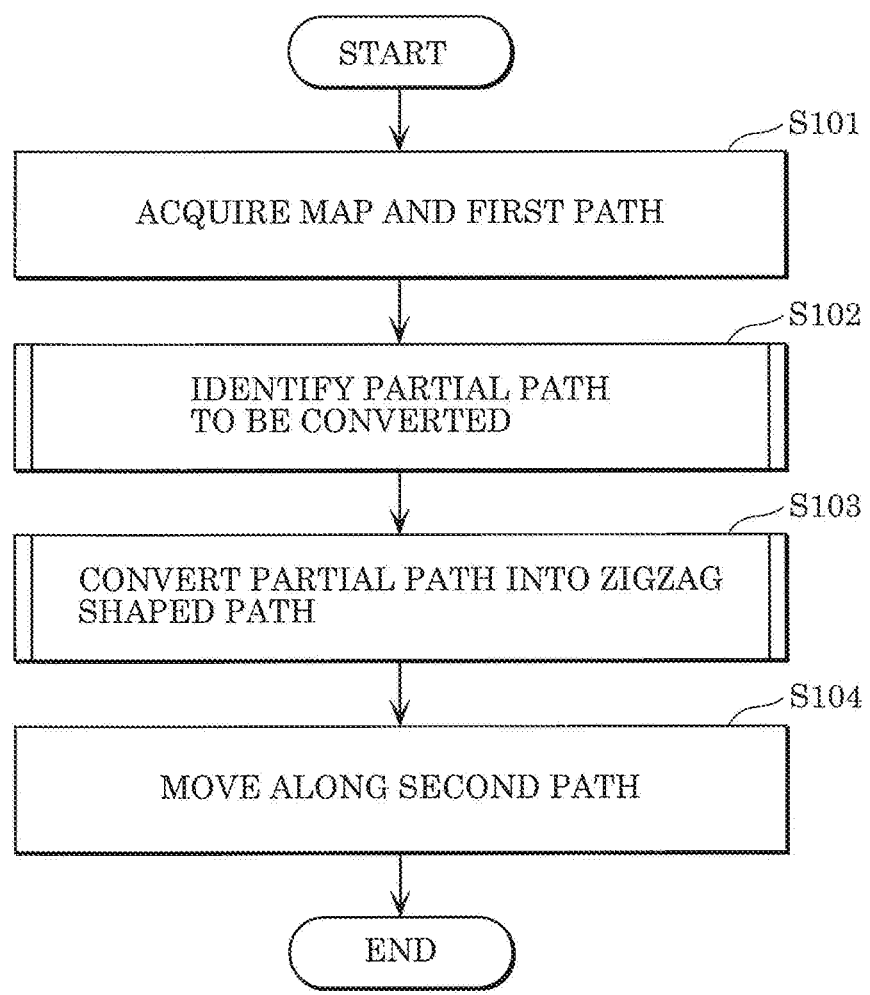
FIG. 9 is a flowchart showing a series of processing executed by the cleaning device according to Embodiment 1.
Figure 10:
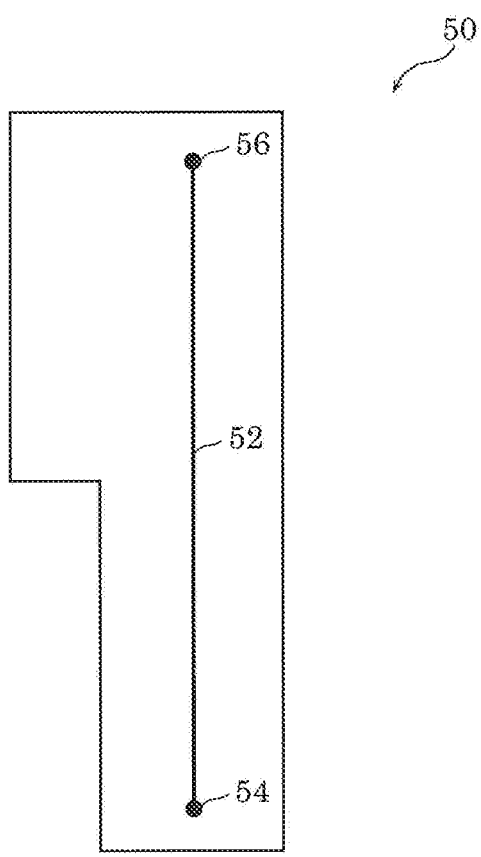
FIG. 10 is an explanatory view showing one example of a map and a path in Embodiment 1.

FIG. 9 is a flowchart showing a series of processing executed by cleaning device 1 of this embodiment. FIG. 10 is an explanatory view showing one example of a map and a path.

In step S101, acquisition unit 21 acquires a map and a path (corresponding to the first path). FIG. 10 shows one example of map 50 and path 52 acquired by acquisition unit 21. FIG. 10 also shows start point 54 and end point 56 of path 52.

Acquisition unit 21 may acquire a map and a path by reading out a map or a path stored in the memory device of cleaning device 1 in advance. With respect to a map, acquisition unit 21 may acquire the map by forming a map of a region where range finding is performable by range finding sensor 12 based on the results of the range finding performed by range finding sensor 12. Acquisition unit 21 may acquire the above-mentioned path such that a path is caused to extend in the current moving direction by a predetermined distance from the current position on the map of cleaning device 1, thus forming a path showing cleaning device 1 moving in the current moving direction of cleaning device 1 without any change.

In step S102, identification unit 22 identifies a partial path to be converted by converter 23 from the first path acquired in step S101. Detailed processing in step S102 is described later in detail.

In step S103, converter 23 converts the partial path to be converted, which is identified in step S102, into a zigzag shaped path, thus generating a second path. Detailed processing in step S103 is described later in detail.

In step S104, motor controller 24 causes motor 16 to drive along the second path, which is generated through conversion by converter 23 in step S103, thus causing cleaning device 1 to move along the second path.

Next, detailed processing of identifying a partial path in the above-mentioned step S102 is described.

Figure 11:
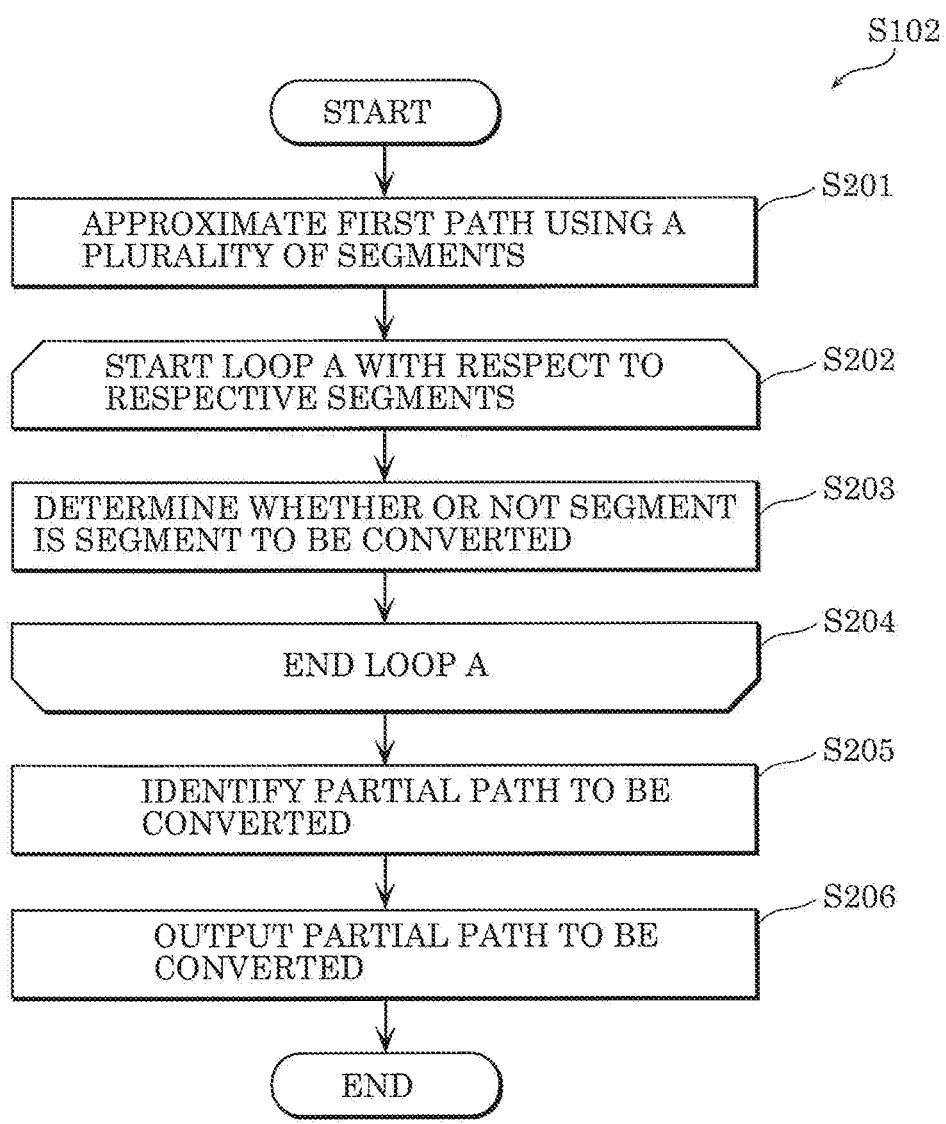
FIG. 11 is a flowchart showing processing of identifying, by an identification unit in Embodiment 1, a partial path to be converted.
Figure 12:
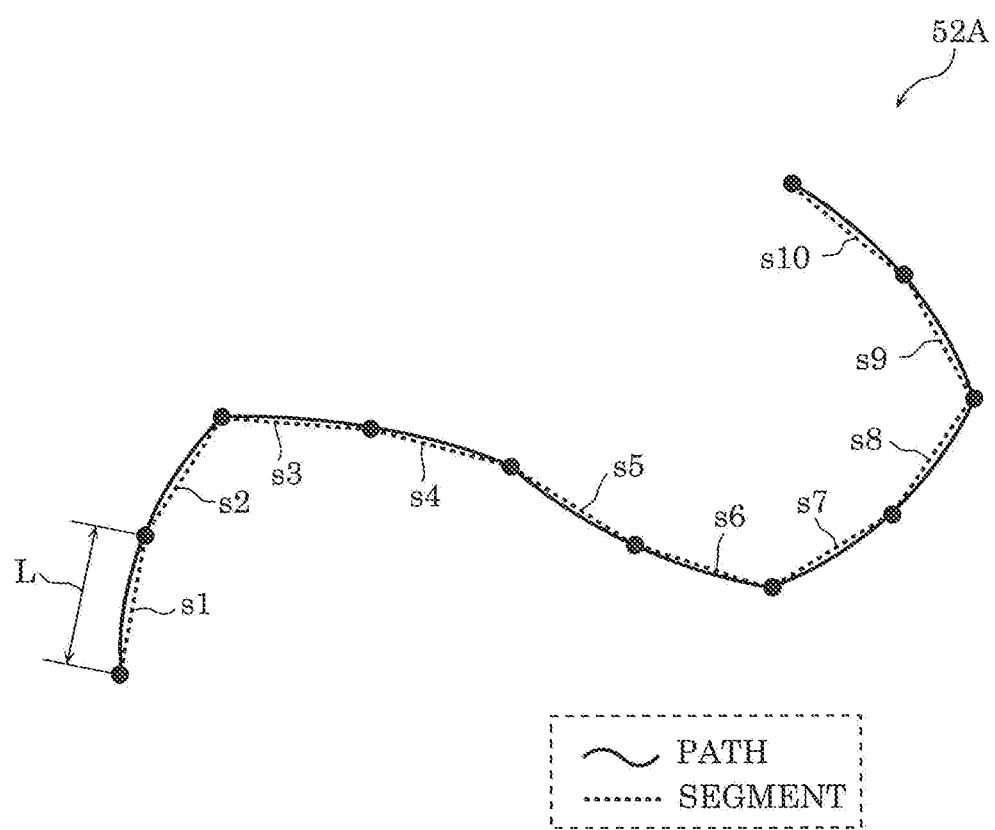
FIG. 12 is an explanatory view of a segment in Embodiment 1.
Figure 13:
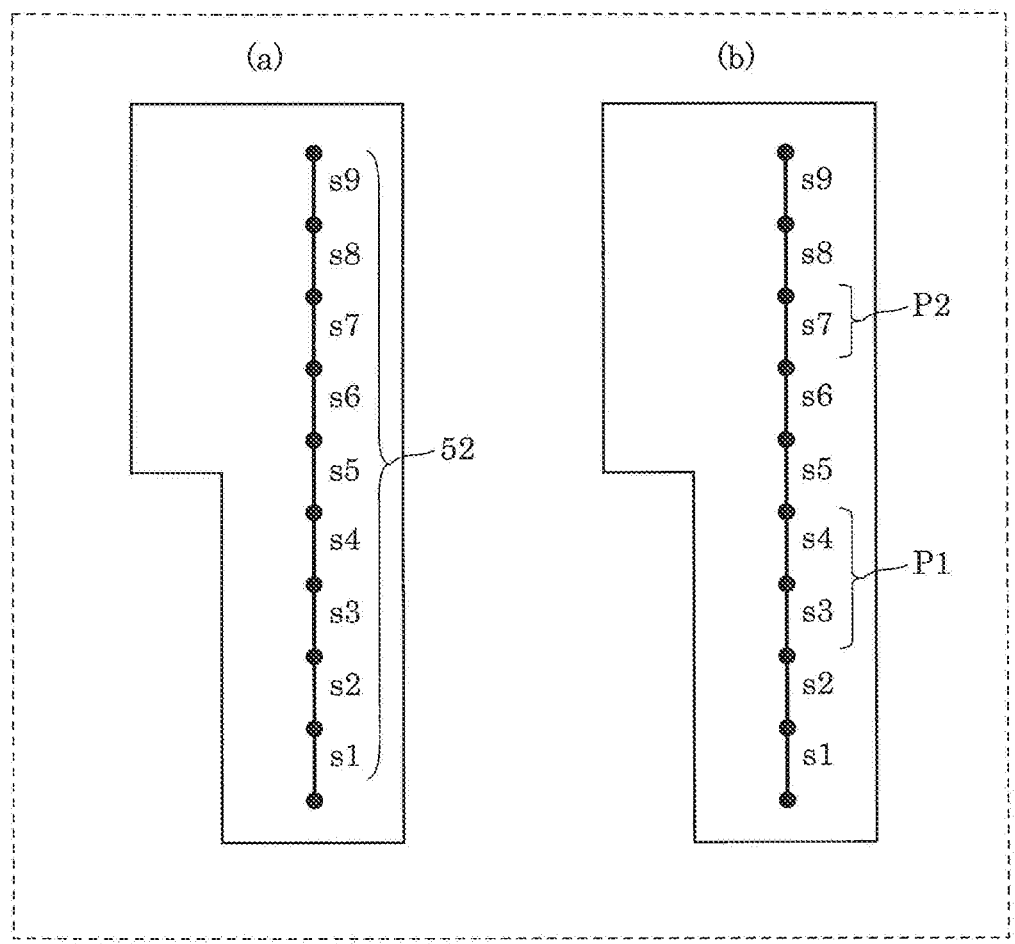
FIG. 13 is an explanatory view showing identification of the partial path to be converted in Embodiment 1.

FIG. 11 is a flowchart showing processing of identifying, by identification unit 22 in this embodiment, a partial path to be converted. FIG. 12 is an explanatory view of segments in this embodiment. FIG. 13 is an explanatory view showing identification of a partial path to be converted in this embodiment.

Processing in step S102 shown in FIG. 9 is described in detail with reference to FIG. 11.

In step S201, identification unit 22 causes the first path acquired in step S101 to be approximated by a plurality of segments each having length L. In this embodiment, each of the plurality of segments is a straight line having length L. For example, length L may be set to become 0.1 m (0.5× 0.2=0.1 m) or less in a state where moving speed of cleaning device 1 is 0.5 m/sec, and the sampling interval of range finding sensor 12 is 0.2 seconds.

FIG. 12 shows one example of the plurality of segments set by identification unit 22. When path 52A indicated by solid lines in FIG. 12 is given to identification unit 22, identification unit 22 sets ten segments s1, s2, s3, . . . indicated by broken lines with respect to path 52A.

When path 52 shown in FIG. 10 is given to identification unit 22, identification unit 22 sets nine segments s1 to s9 shown in (a) in FIG. 13.

In step S202, identification unit 22 performs processing of starting loop A where step S203 described later is repeatedly executed. In loop A, processing is executed by focusing on one of the plurality of segments acquired in step S201, and eventually processing is executed on each of the above-mentioned plurality of segments.

In step S203, identification unit 22 decides whether or not the segment being focused on is set as a segment to be converted. For example, identification unit 22 identifies segments s3, s4, and s7 as segments to be converted. A decision method is described later in detail.

In step S204, identification unit 22 performs end processing of loop A. To be more specific, identification unit 22 determines whether or not processing in step S203 is already performed on all of the plurality of segments acquired in step S201. When processing in step S203 is not yet performed on all of the plurality of segments acquired in step S201, control is performed so as to perform processing in step S203 on channels on which processing is not yet performed.

In step S205, identification unit 22 identifies a partial path to be converted based on the results of processing from steps S202 to S204. At this point of operation, identification unit 22 identifies in principle one segment to be converted as one partial path to be converted. However, in the case where segments to be converted are contiguous, the plurality of contiguous segments to be converted are identified as one partial path to be converted. For example, contiguous segments s3 and s4 identified as segments to be converted in step S203 are identified as one partial path P1. Further, segment s7 identified as a segment to be converted in step S203 is identified as one partial path P2 (see (b) in FIG. 13).

In step S206, identification unit 22 outputs a partial path to be converted identified in step S205. For example, when path 52 shown in FIG. 10 is given to identification unit 22, partial paths P1 and P2 are outputted as partial paths to be converted (see (b) in FIG. 13).

Figure 14:
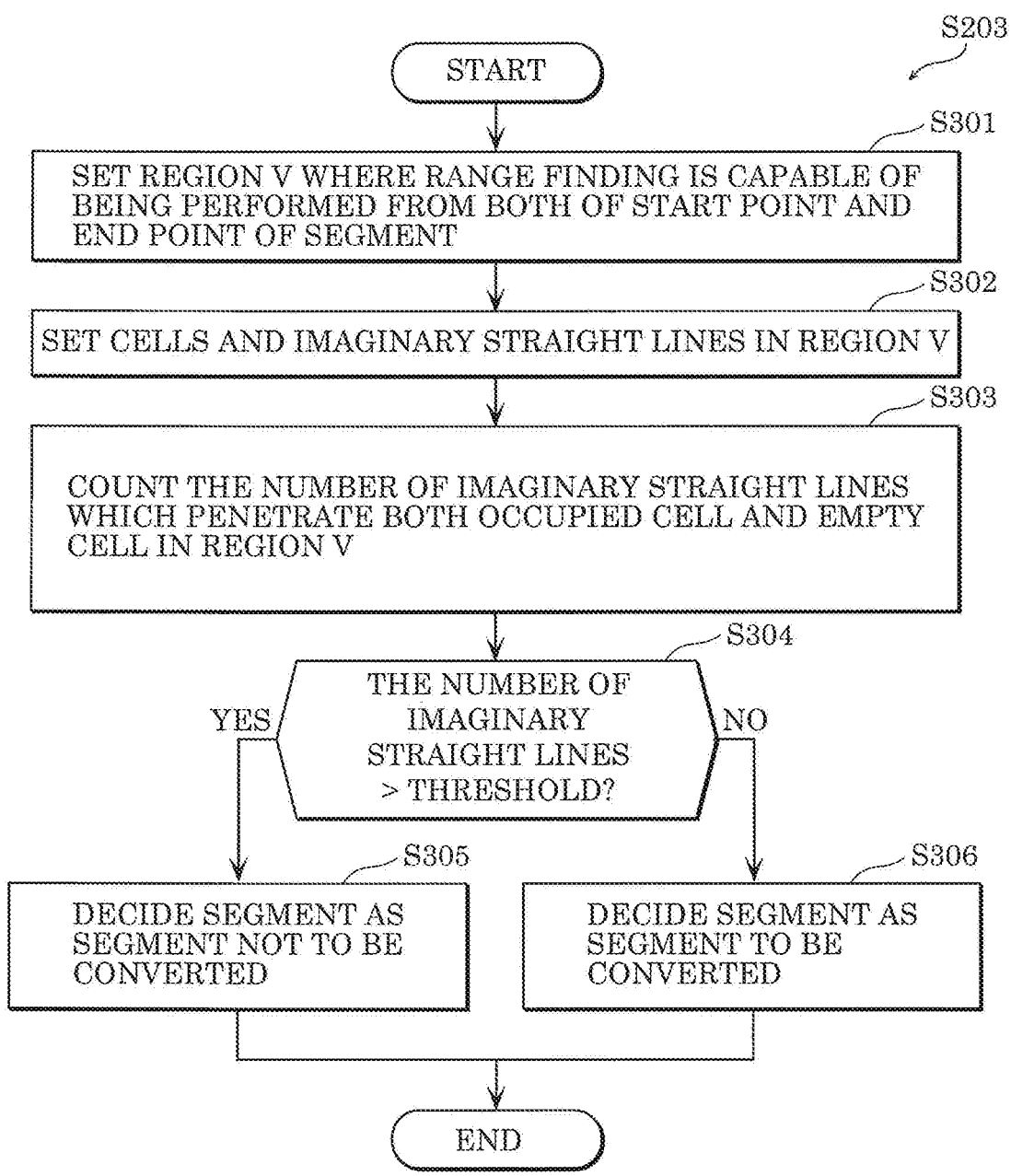
FIG. 14 is a flowchart showing processing of deciding, by the identification unit in Embodiment 1, a segment to be converted.
Figure 15:
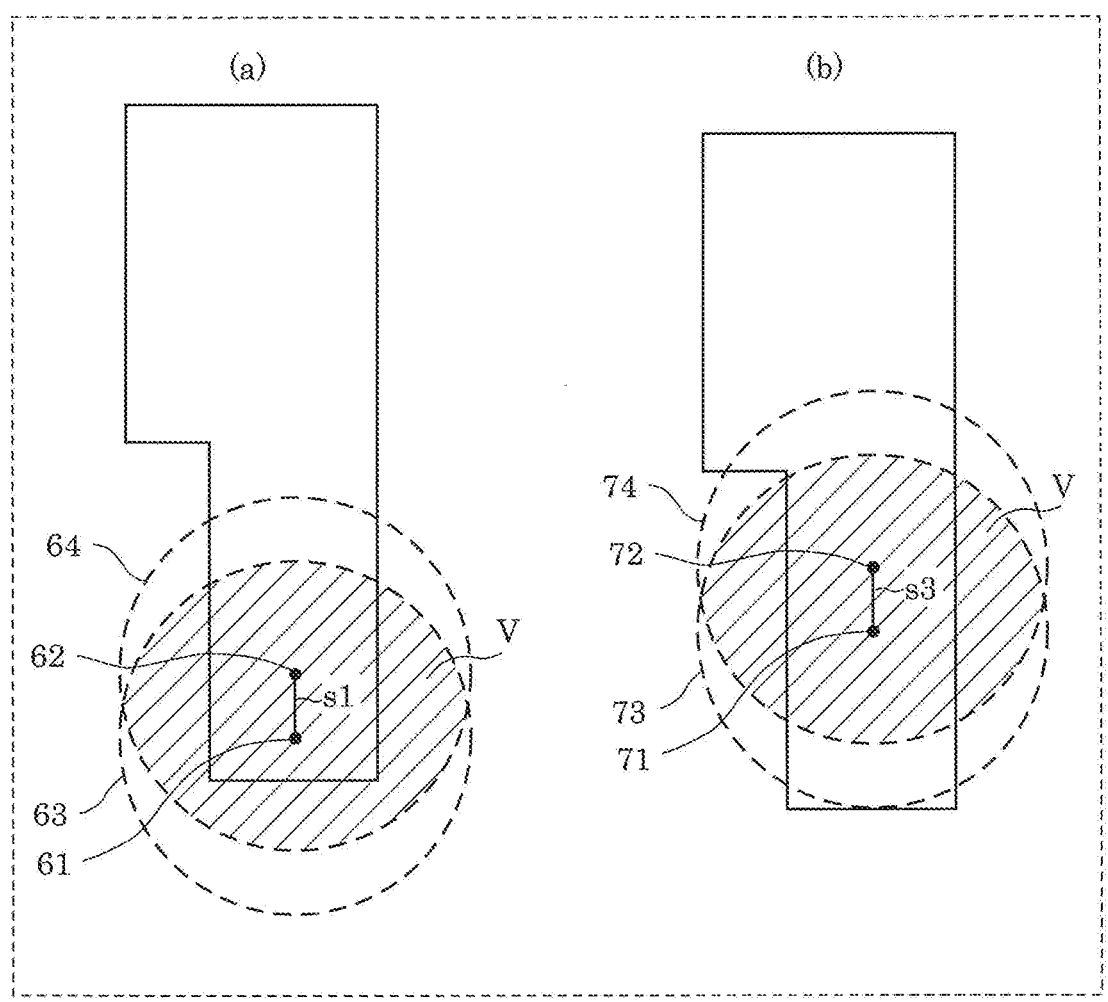
FIG. 15 is an explanatory view of a region where range finding is performable from both of the start point and the end point of a segment in Embodiment 1.
Figure 16:
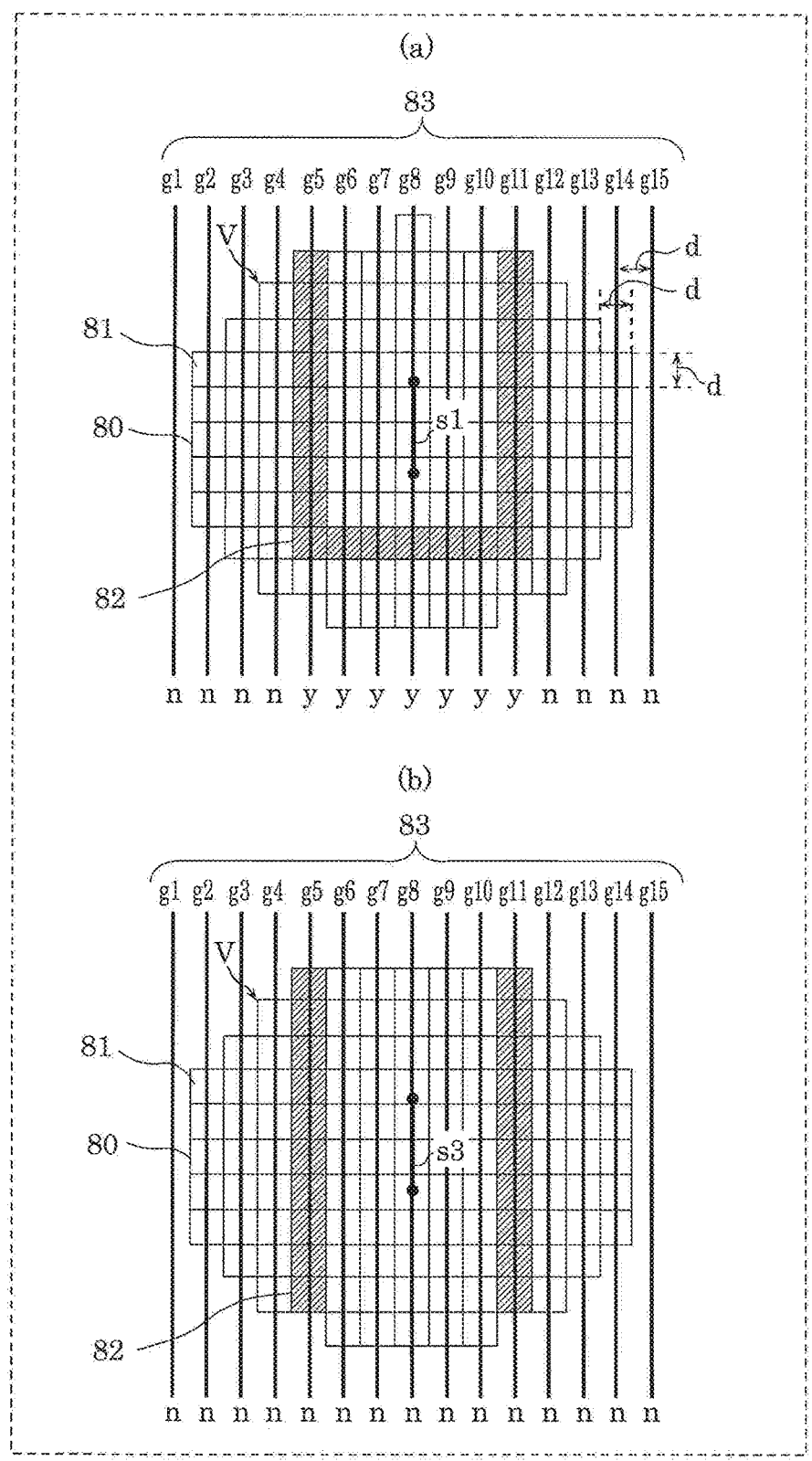
FIG. 16 is a first explanatory view of imaginary straight lines set in a region where range finding is performable in Embodiment 1, empty cells, and occupied cells.

FIG. 14 is a flowchart showing processing of deciding, by identification unit 22 in this embodiment, a segment to be converted. FIG. 15 is an explanatory view of a region where range finding is performable from both of the start point and the end point of the segment in this embodiment. FIG. 16 is an explanatory view of imaginary straight lines set in the region, empty cells, and occupied cells in this embodiment.

Processing in step S203 shown in FIG. 7 is described in detail with reference to FIG. 14. Processing shown in FIG. 14 is a series of processing performed on one segment being focused on in step S202.

In step S301, identification unit 22 sets, on the map, region V where range finding is performable by range finding sensor 12 from both of the start point and the end point of one segment being focused on. The specific example of region V to be set is described with reference to FIG. 15.

In FIG. 15, (a) shows region V for segment s1. Identification unit 22 sets, as region V, a common region between region 63, where range finding is performable by range finding sensor 12 from start point 61 of segment s1, and region 64 where range finding is performable by range finding sensor 12 from end point 62 of segment s1.

In FIG. 15, (b) shows region V for segment s3. Identification unit 22 sets, as region V, a common region between region 73, where range finding is performable by range finding sensor 12 from start point 71 of segment s3, and region 74, where range finding is performable by range finding sensor 12 from end point 72 of segment s1.

In step S302, identification unit 22 sets a plurality of cells arranged in region V, and a plurality of imaginary straight lines parallel to one segment being focused on. For example, each of the plurality of cells has a square shape or a rectangular shape where one side has a length substantially equal to resolution of range finding sensor 12 (approximately 5 cm, for example). Further, the plurality of imaginary straight lines are set at fixed intervals. The interval between the imaginary straight lines is set to a length substantially equal to resolution of range finding sensor 12. Specific example of the plurality of cells to be set and the imaginary straight lines is described with reference to (a) and (b) in FIG. 16. Each of (a) and (b) in FIG. 16 shows region V on the map. Cells where an object is present are shaded. On the other hand, cells where an object is not present are blank.

In FIG. 16, (a) shows a plurality of cells 80 and a plurality of imaginary straight lines 83 (to be more specific, imaginary straight lines g1 to g15) for segment s1. Cells 80 include empty cells 81 and occupied cells 82. Empty cell 81 is a cell where an object is not present in the cell. Occupied cell 82 is a cell where an object is present in the cell. Each of the length of one side of cell 80, and the interval between the plurality of imaginary straight lines 83 is set to "d". In the same manner, (b) in FIG. 16 shows a plurality of cells 80 and a plurality of imaginary straight lines 83 for segment s3.

In step S303, identification unit 22 counts the number of imaginary straight lines 83 which penetrate both empty cell 81 and occupied cell 82 in region V. For example, in (a) in FIG. 16, imaginary straight line g4 of the plurality of imaginary straight lines 83 penetrates only empty cells 81 in region V. In other words, imaginary straight line g4 penetrates only empty cells 81, but does not penetrate occupied cell 82. Accordingly, imaginary straight line g4 is not counted in the above-mentioned number of imaginary straight lines 83 which penetrate both empty cell 81 and occupied cell 82 in region V. Character "n" is given to such imaginary straight line in (a) in FIG. 16. On the other hand, imaginary straight line g5 of the plurality of imaginary straight lines 83 penetrates empty cell 81 and occupied cells 82 in region V. Accordingly, imaginary straight line g5 is counted in the above-mentioned number of imaginary straight lines 83 which penetrate both empty cell 81 and occupied cell 82 in region V. Character "y" is given to such imaginary straight line in (a) in FIG. 16. Thus, the number of imaginary straight lines 83 which penetrate both empty cell 81 and occupied cell 82 in (a) in FIG. 16 is seven, which is the number of imaginary straight lines 83 to which character "y" is given.

In the same manner, (b) in FIG. 16 shows a plurality of cells 80 and a plurality of imaginary straight lines 83 (to be more specific, imaginary straight lines g1 to g15) for segment s3. As objects present in region V (that is, occupied cells 82), only one or more straight lines which extend parallel to segment s3 and which traverse region V is shown in (b) in FIG. 16. In such a state, imaginary straight lines 83 includes imaginary straight lines which penetrate only empty cells 81, and imaginary straight lines which penetrate only occupied cells 82. In other words, there is no imaginary straight line 83 which penetrates both empty cell 81 and occupied cell 82. The term "traverse" means that occupied cells 82 are arranged from end to end of region V as shown in (b) in FIG. 16.

In view of the above, the number of imaginary straight lines 83 which penetrate both empty cell 81 and occupied cell 82 in (b) in FIG. 16 is zero, which is the number of imaginary straight lines 83 to which "y" is given.

In step S304, identification unit 22 determines whether or not the number of imaginary straight lines counted in step S303 is greater than a predetermined threshold. The threshold is a numerical value equal to or greater than zero. The larger threshold can obtain more effect to improve robustness in the measurement. In this embodiment, the case where the threshold is zero is described as an example. When identification unit 22 determines that the number of imaginary straight lines is greater than a predetermined threshold (Yes in step S304), the processing advances to step S305. When identification unit 22 determines that the number of imaginary straight lines is not greater than a predetermined threshold (No in step S304), the processing advances to step S306. To be more specific, with respect to segment s1, as shown in (a) in FIG. 16, seven which is the number of imaginary straight lines counted in step S303 is greater than zero which is the threshold, and hence, the processing advances to step S304. With respect to segment s3, as shown in (b) in FIG. 16, zero which is the number of imaginary straight lines counted in step S303 is not greater than zero which is the threshold and hence, the processing advances to step S305.

In step S305, identification unit 22 decides one segment being focused on as a segment not to be converted.

In step S306, identification unit 22 decides one segment being focused on as a segment to be converted.

Due to a series of processing shown in FIG. 14, identification unit 22 can identify a partial path where only one or more straight lines which traverse the region are represented as objects which are present in region V on the map where range finding is performable by range finding sensor 12 from both of the start point and the end point of the partial path, and a line segment directed to the end point from the start point of the partial path is parallel to each of the above-mentioned one or more straight lines.

Figure 17:
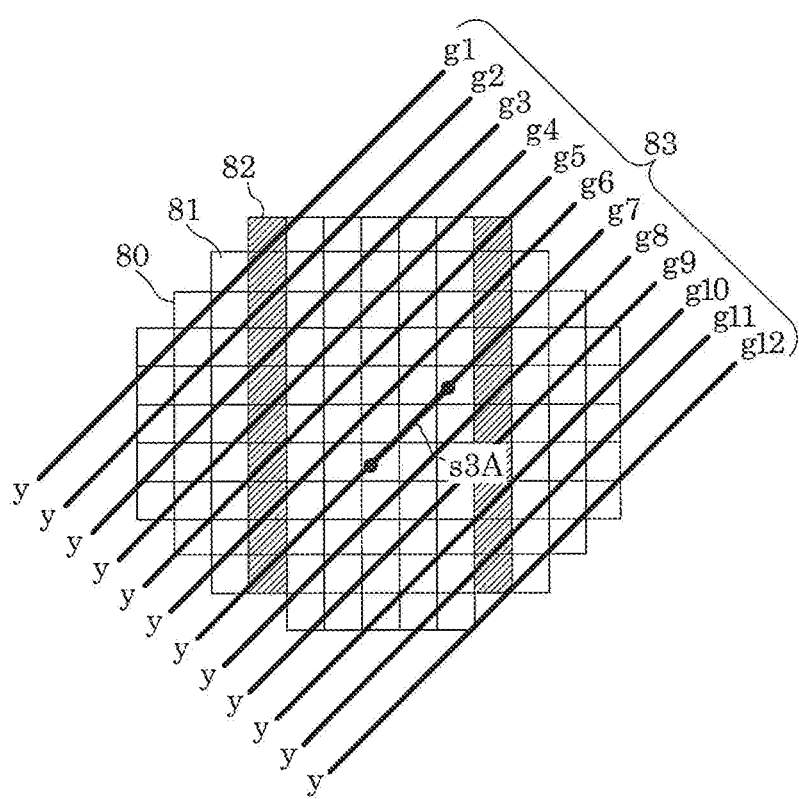
FIG. 17 is a second explanatory view of imaginary straight lines set in a region where range finding is performable in Embodiment 1, empty cells, and occupied cells.

FIG. 17 shows one example of setting of region V and imaginary straight lines when a segment is not parallel to a wall. Region V shown in FIG. 17 is equal to region V shown in (b) in FIG. 16. Segment s3A shown in FIG. 17 differs from segment s3 shown in (b) in FIG. 16 with respect to an angle. In this case, as shown in FIG. 17, a plurality of imaginary straight lines 83 are set non-parallel to a grid. Identification unit 22 counts 12 as the number of imaginary straight lines 83 which penetrate both empty cell 81 and occupied cell 82 in region V (step S303). The number "12" is greater than zero which is the threshold and hence, identification unit 22 identifies segment s3A as a segment not to be converted (step S305).

Figure 18:
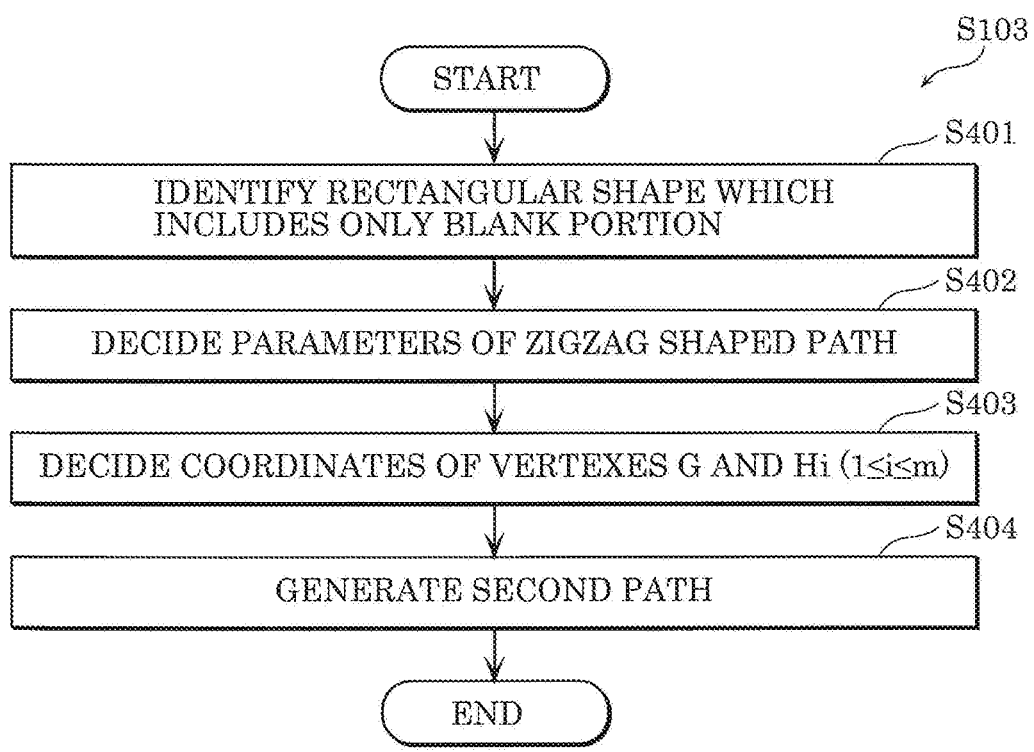
FIG. 18 is a flowchart showing processing of converting, by the converter in Embodiment 1, a partial path to be converted.
Figure 19:
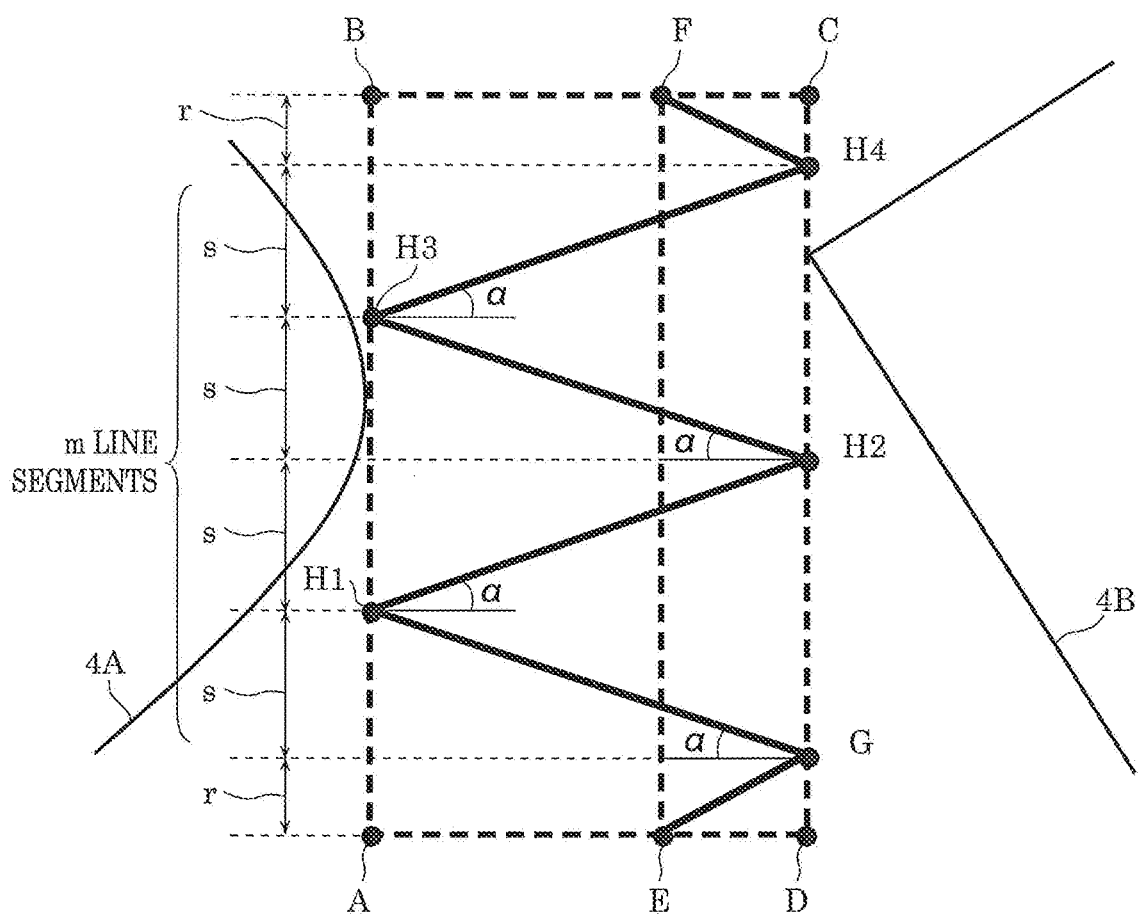
FIG. 19 is an explanatory view showing conversion of a path performed by a converter in Embodiment 1.

FIG. 18 is a flowchart showing processing of converting a partial path to be converted by converter 23 in this embodiment. FIG. 19 is an explanatory view showing conversion of a path performed by converter 23 in this embodiment.

In step S401, converter 23 sets a rectangular shape around a partial path to be converted. This rectangular shape is a rectangular shape formed of (a) two straight lines parallel to the partial path, (b) a straight line which includes the start point of the partial path, and which is perpendicular to the partial path, and (c) a straight line which includes the end point of the partial path, and which is perpendicular to the partial path. The two straight lines of the above-mentioned rectangular shape which are parallel to the partial path may be set such that a blank portion included in the rectangular shape assumes a maximum area. Rectangular shape ABCD shown in FIG. 19 is set to have a maximum blank portion while satisfying the condition that rectangular shape ABCD does not include walls 4A and 4B. Assume the case where as shown in FIG. 19, converter 23 acquires partial path EF including start point E and end point F as a partial path to be converted, for example. In this case, converter 23 sets rectangular shape ABCD around partial path EF. In this embodiment, side AB and side CD are parallel to partial path EF. Further, start point E is disposed on side AD, and end point F is disposed on side BC.

In step S402, converter 23 decides parameters of a zigzag shaped path which can be acquired by converting partial path EF. The specific description is made with reference to FIG. 19.

As shown in FIG. 19, the zigzag shaped path is formed of an initial path, an intermediate path, and an end path. The intermediate path is a path along which cleaning device 1 is to move in a zigzag manner in a direction forming angle α with respect to the direction perpendicular to partial path EF to be converted. The initial path is a straight line path ranging from the start point of partial path EF to be converted to the start point of the intermediate path. The end path is a straight line path ranging from the end point of the intermediate path to the end point of partial path EF to be converted. Angle α is an angle determined within a range from 0 degrees to 90 degrees depending on the size of casing 11, the width of suction portion 17, and the like. Angle α may be 45 degrees, for example.

Converter 23 decides variables "s", "m", and "r" in FIG. 19 as follows. Variable "s" is a component parallel to partial path EF in the movement amount of cleaning device 1 when cleaning device 1 moves along one straight line forming a zigzag shaped path. Variable "s" is expressed as follows.

$$s = \|BC\| \times \tan\alpha \quad \text{(formula 1)}$$

Variable "m" is the number of straight lines forming a zigzag shaped path. Variable "m" is expressed as follows. FIG. 19 is a view showing a case where variable "m" is 4.

$$m = \text{floor}(\|AB\|/s) \quad \text{(formula 2)}$$

Variable "r" is a component parallel to partial path EF in the movement amount of cleaning device 1 when cleaning device 1 moves along each of the initial path and the end path. Variable "r" is expressed as follows.

$$r = (\|AB\| - m \times s)/2 \quad \text{(formula 3)}$$

In step S403, converter 23 decides coordinates of vertexes G and Hi ("i" being an integer value between one or more and m or less) of a zigzag shaped path based on variables "s", "m", and "r" calculated in step S402. Vertex G is a point which satisfies $\|DG\| = r$ on side CD. Vertex G is the start point of the intermediate path. When "i" is an odd number, vertex Hi is a point which satisfies $\|HiA\| = r + i \times s$ on side AB. On the other hand, when "i" is an even number, vertex Hi is a point which satisfies $\|HiD\| = r + i \times s$ on side CD.

In step S404, converter 23 generates a zigzag shaped path which is decided in step S403. To be more specific, converter 23 generates line segment GH1, line segment H1H2, line segment H2H3, ..., line segment HmF as a second path using vertexes G and Hi decided in step S403.

The second path generated from path 52 shown in FIG. 10 through the above-mentioned series of operations is described.

Figure 20:
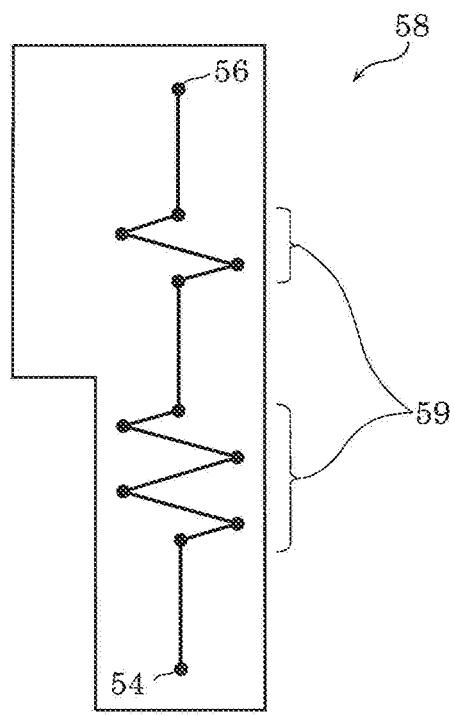
FIG. 20 is an explanatory view of a converted path in Embodiment 1.

FIG. 20 is an explanatory view of a converted path in this embodiment.

Path 58 shown in FIG. 20 is acquired such that partial paths to be converted of path 52 shown in FIG. 10 are converted into paths 59 having a zigzag shape. Cleaning device 1 moves along path 58 so that cleaning device 1 can move while avoiding a state where self-position estimation cannot be performed.

Figure 21:
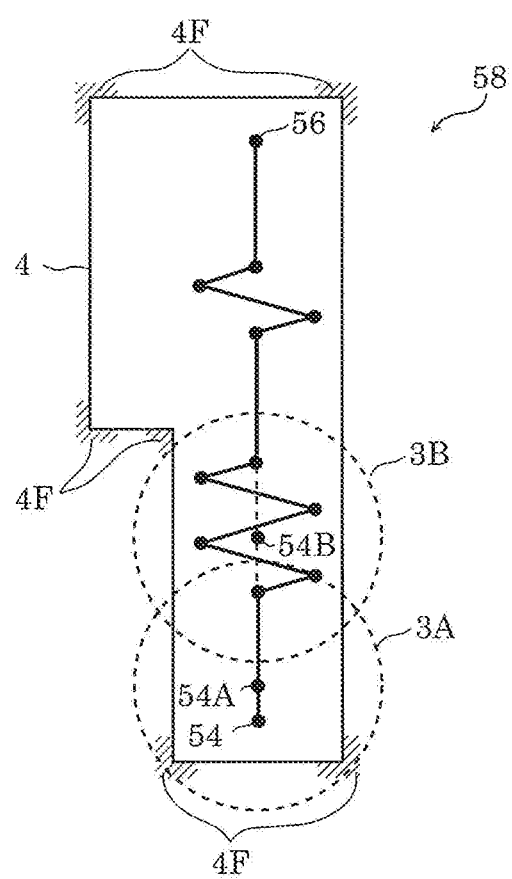
FIG. 21 is an explanatory view of a movement path of the cleaning device according to Embodiment 1.

The movement path of cleaning device 1 may also be described as follows with reference to FIG. 21. FIG. 21 is an explanatory view of the movement path of cleaning device 1 of this embodiment. As shown in FIG. 21, it is defined that end edge portions 4F are present on wall 4. End edge portion 4F is a portion of wall 4 which is not a planar surface, and which is not a straight line as viewed in a top plan view. To be more specific, end edge portion 4F is a portion disposed within a predetermined distance (approximately 5 cm, for example) from the end portion of a planar surface. Portions of wall 4 excluding end edge portions 4F are referred to as planar portions. In other words, a map of the environment as viewed from above shown in FIG. 21 includes a region where cleaning device 1 is capable of moving, and lines which correspond to walls surrounding the region. A position having a corner formed by lines corresponds to an end portion of a planar surface. Further, when an obstacle is present on the map, the corner of the obstacle also corresponds to the end portion of the planar surface.

In this case, in causing cleaning device 1 to move along the movement path parallel to a planar portion in the vicinity of wall 4 having planar portions and end edge portions 4F, (a) motor controller 24 causes cleaning device 1 to move parallel to the planar portion when the planar portion and end edge portion 4F are present in a region where range finding is performable by range finding sensor 12, and (b) motor controller 24 causes cleaning device 1 to move along a zigzag shaped movement path converted from the above-mentioned movement path when only the planar portion from the planar portion and end edge portion 4F is present in the region where range finding is performable by range finding sensor 12. To be more specific, when cleaning device 1 is positioned at position 54A in FIG. 21, planar portions and end edge portions 4F are present in region 3A where range finding is performable by range finding sensor 12. Accordingly, cleaning device 1 moves along the planar portion in such a case. On the other hand, when cleaning device 1 is positioned at position 54B, only planar portions from the planar portions and end edge portions 4F are present in region 3B where range finding is performable by range finding sensor 12. Accordingly, cleaning device 1 moves along a zigzag shaped path in such a case.

If a mobile robot which is the cleaning device of this embodiment moves along the first path, the distance to objects around the mobile robot does not vary and hence, self-position estimation is not appropriately performed. However, as described above, when self-position estimation is not appropriately performed, a movement path of the mobile robot is changed to a path different from the first path. With such a change, the distance to the objects around the mobile robot varies when the mobile robot moves and hence, self-position estimation is appropriately performed. Accordingly, the mobile robot can move along a more appropriate movement path.

Further, the mobile robot changes the movement path from the first path to the second path which is formed such that the distance to objects around mobile robot varies when mobile robot moves. In the case where the mobile robot moves parallel to a straight line indicating an object on the map, the distance to the objects around mobile robot does not vary when the mobile robot moves. Accordingly, self-position estimation is not appropriately performed by the mobile robot. In view of the above, as described above, the path along which the mobile robot is to move parallel to a wall is prevented from being included in the second path, thus allowing self-position estimation to be appropriately performed.

The mobile robot changes the movement path from the first path to the zigzag shaped second path formed such that the distance to objects around the mobile robot varies when the mobile robot moves. With such a configuration, the mobile robot can easily generate the second path along which self-position estimation can be performed and hence, the mobile robot can move along a more appropriate movement path.

The mobile robot easily determines whether or not it is necessary to change a path based on the positions of objects around the mobile robot. Accordingly, the mobile robot can move along a more appropriate movement path due to appropriate self-position estimation.

When the mobile robot moves along the movement path which includes the second path where self-position estimation can be performed, there is a possibility that the mobile robot cannot move along the zigzag shape which the second path describes. To be more specific, in a zigzag shape, a first line and a second line having different directions are connected with each other, and a connected point has a predetermined angle or more. In other words, the description "a first line and a second line having different directions are connected with each other" means that a line obtained by connecting the first line and the second line is not a straight line. There is a possibility that cleaning device 1 shown in FIG. 5, for example, wheel 15a and wheel 15b, cannot move along the predetermined angle or more and hence, cleaning device 1 moves to connect lines having different directions with an arc at a point where lines of the movement path are connected with each other. That is, when cleaning device 1 moves along the movement path, there is a possibility that the movement trajectory of casing 11 of cleaning device 1 at an arbitrary point does not completely agree with a planned movement path. The actual movement trajectory of cleaning device 1 may be replaced with a movement path where a connected point between lines of a zigzag shape is supplemented by an arc.

The same applies for the movement trajectory of wheel 15a or wheel 15b of the cleaning device. The degree that the connected point between lines of a zigzag shape is supplemented by an arc varies depending on performance of changing direction of cleaning device 1. In the case where a new motor which controls the direction of wheel 15a and wheel 15b is provided so that the direction of wheel 15a and wheel 15b can be changed corresponding to a planned movement path, the actual movement trajectory of cleaning device 1 may be set equal to the movement path.

Embodiment 2

In this embodiment, cleaning device 1A as a mobile robot which can move along a more appropriate movement path is described. The cleaning device of this embodiment generates a second path in the same manner as cleaning device 1 according to Embodiment 1 and, further, generates a third path which is different from the second path. Then, the cleaning device selects one path from the second path and the third path, and moves along the selected path.

Cleaning device 1A of this embodiment differs from cleaning device 1 according to Embodiment 1 with respect to the configuration of control circuit 19. Hereinafter, the configuration of control circuit 19A, which corresponds to control circuit 19 in Embodiment 1, is described in detail.

Figure 22:
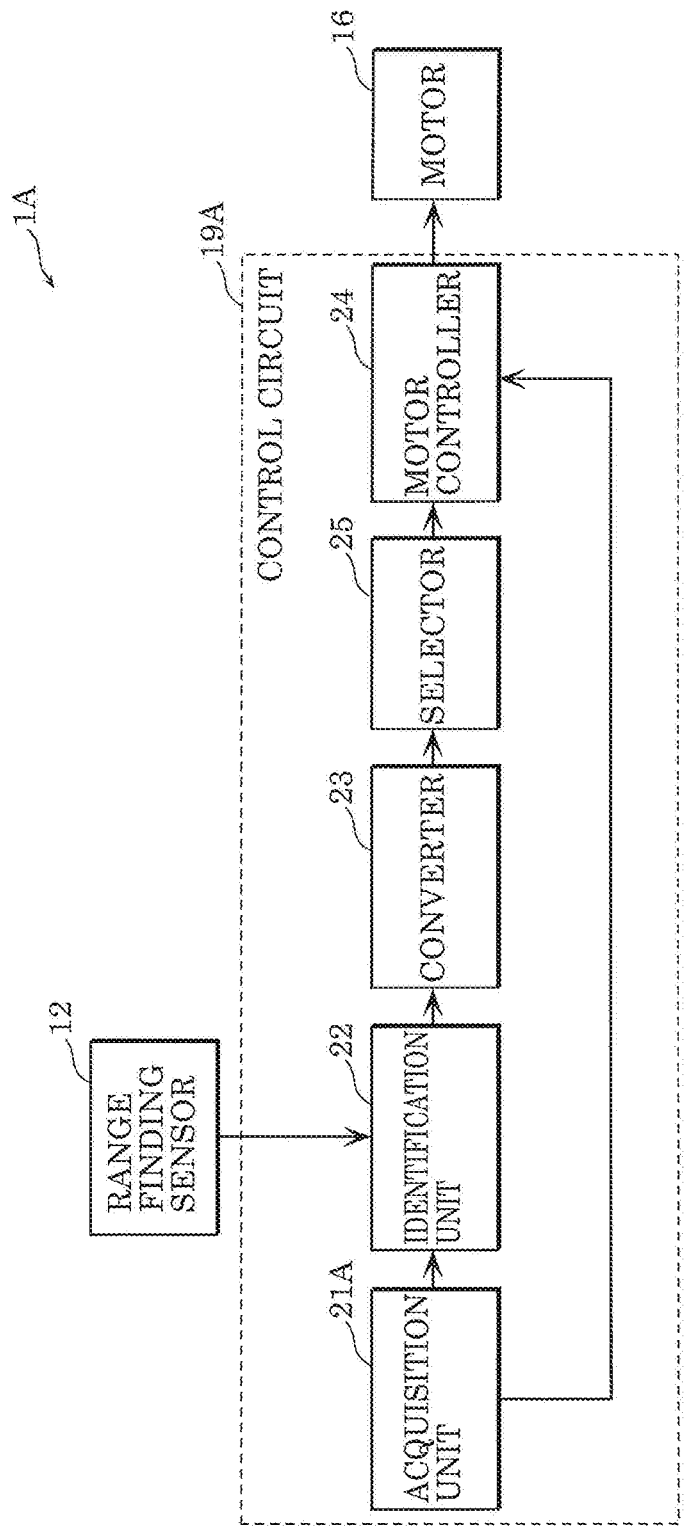
FIG. 22 is a block diagram showing the function of a control circuit of a cleaning device according to Embodiment 2 in detail.

FIG. 22 is a block diagram showing the function of control circuit 19A of cleaning device 1A of this embodiment in detail.

As shown in FIG. 22, control circuit 19A includes acquisition unit 21A, identification unit 22, converter 23, motor controller 24, and selector 25. In this embodiment, the configurations of identification unit 22, converter 23, and motor controller 24 are substantially equal to the configurations of corresponding components in Embodiment 1 and hence, detailed description of such components is omitted.

In the same manner as acquisition unit 21 in Embodiment 1, acquisition unit 21A acquires a map showing positions of objects present around cleaning device 1A, and a first path along which cleaning device 1A is to move. Acquisition unit 21A also acquires a third path along which cleaning device 1A is to move. The third path is a path generated based on the map independently from the second path generated by converter 23. The third path is a path along which self-position estimation can be performed by cleaning device 1A. The third path may be generated by cleaning device 1A, or may be generated by another device.

To be more specific, in this embodiment, the third path includes (a) a fourth path, (b) a fifth path, and (c) a sixth path. (a) The fourth path is a path along which cleaning device 1A is to move in a zigzag manner from the start point of the third path along a peripheral edge portion of a movable region on the map where cleaning device 1A is capable of moving. (b) The fifth path is a path along which cleaning device 1A is to move in a zigzag manner from the end point of the fourth path along a portion of the movable region excluding the peripheral edge portion. (c) The sixth path is a path along which cleaning device 1A is to move in a zigzag manner, and which extends from the end point of the fifth path to the end point of the third path.

Selector 25 selects one path from the second path and the third path. Selector 25 acquires the second path from converter 23, and acquires the third path from acquisition unit 21A. Selector 25 performs a comparison between the number of times cleaning device 1A changes direction when cleaning device 1A moves along the second path and the number of times cleaning device 1A changes direction when cleaning device 1A moves along the third path. Then, selector 25 selects a path where the number of times cleaning device 1A changes direction is fewer. The reason is as follows. In changing direction, the position of cleaning device 1A is held. Accordingly, with the fewer number of times cleaning device 1A changes direction, a shorter time is required for movement of cleaning device 1A along the path.

Motor controller 24 drives motor 16 so as to cause cleaning device 1A to move along the path selected from the second path and the third path by selector 25.

Next, processing of cleaning device 1A is described.

Figure 23:
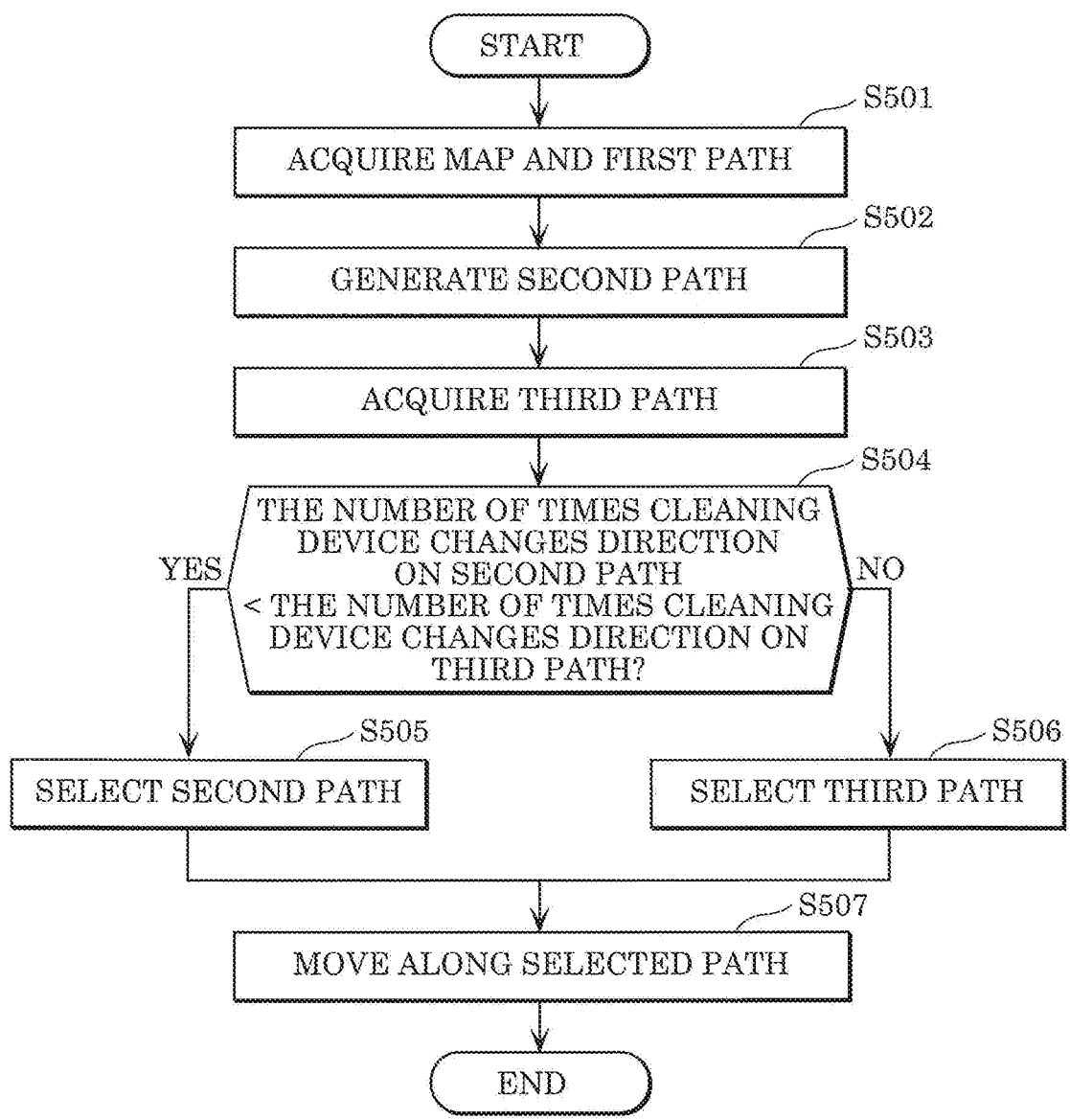
FIG. 23 is a flowchart showing a series of processing relating to acquisition and conversion of a path and the like, and traveling of the cleaning device according to Embodiment 2.
Figure 24:
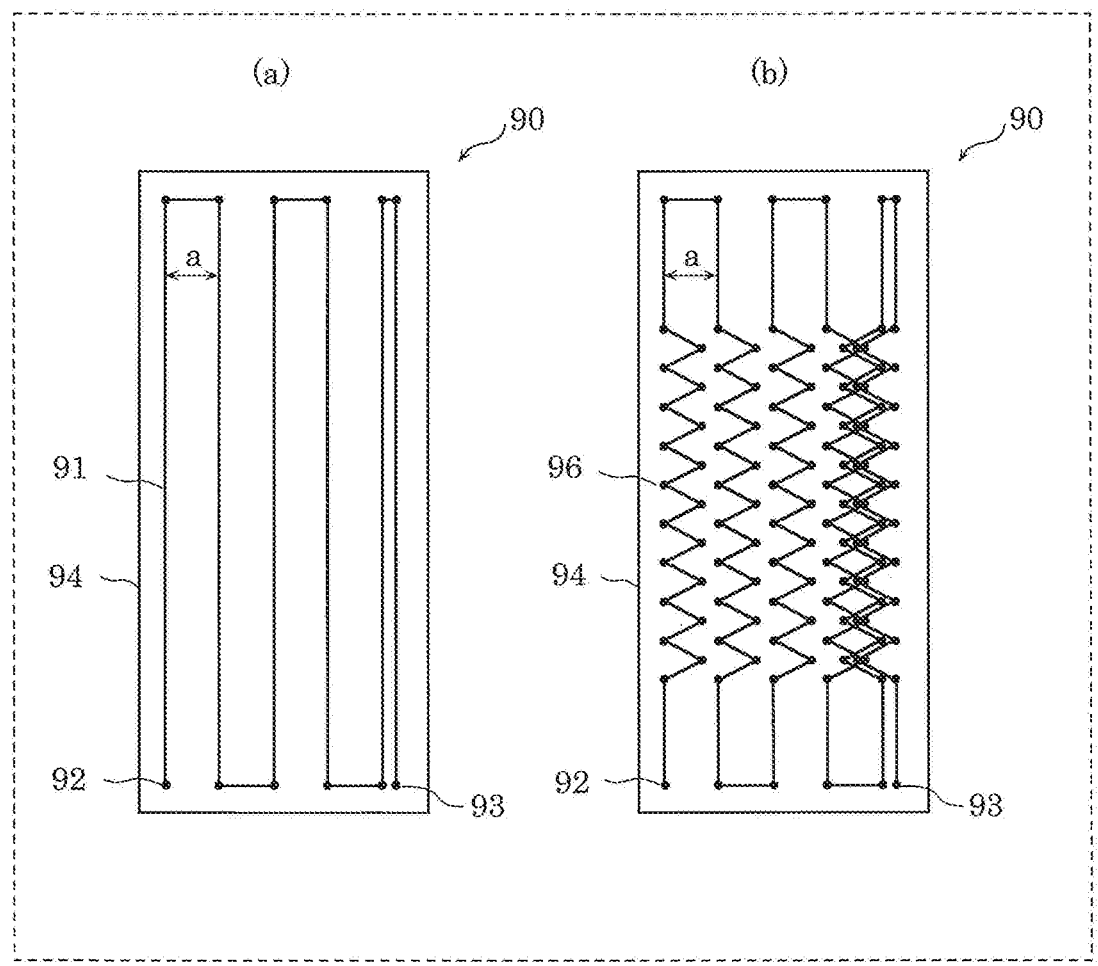
FIG. 24 is an explanatory view showing a first example of a movement path of the cleaning device according to Embodiment 2.
Figure 25:
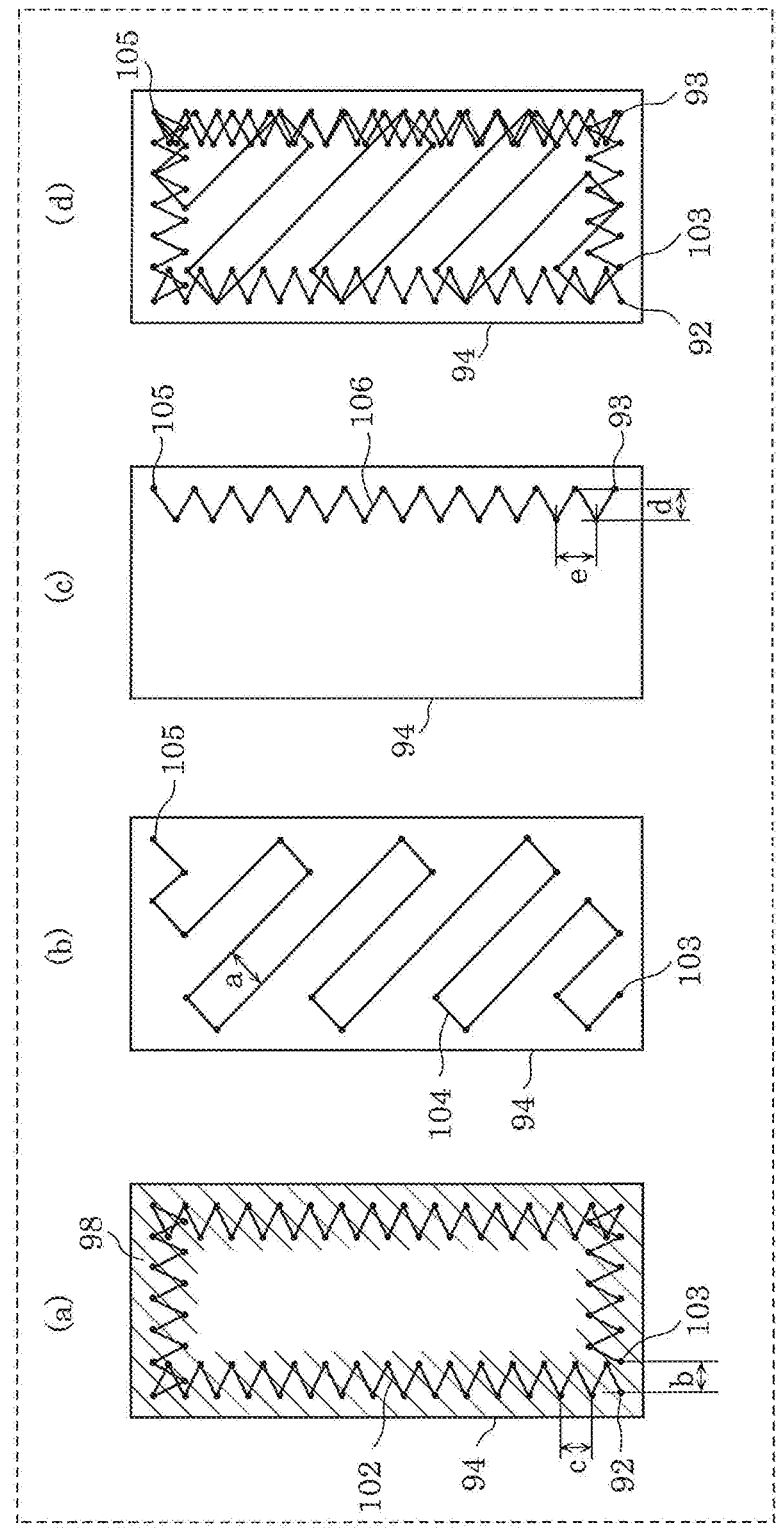
FIG. 25 is an explanatory view showing a second example of the movement path of the cleaning device according to Embodiment 2.

FIG. 23 is a flowchart showing a series of processing relating to acquisition and conversion of a path and the like, and traveling of cleaning device 1A of this embodiment. FIG. 24 is an explanatory view showing a first example of the movement path of cleaning device 1A of this embodiment. FIG. 25 is an explanatory view showing a second example of the movement path of cleaning device 1A of this embodiment.

In step S501, acquisition unit 21A acquires a map and a first path. Processing in step S501 is equal to processing in step S101 in Embodiment 1 (see FIG. 9). In FIG. 24, (a) shows one example of the map and the first path acquired in step S501. In (a) in FIG. 24, path 91 and wall 94 are shown on map 90. In FIG. 24, (a) also shows start point 92 and end point 93 of path 91. Path 91 is one example of a path for thoroughly cleaning a movable region for cleaning device 1A.

In step S502, identification unit 22 and converter 23 generate a second path based on the map and the first path. Processing in step S502 is equal to processing in step S102 and step S103 in Embodiment 1 (see FIG. 9). In FIG. 24, (b) shows one example of the second path generated in step S502. Here, (b) in FIG. 24 shows path 96 which is a second path generated based on path 91 shown in (a) in FIG. 24. Path 96 is a path for thoroughly cleaning a movable region for cleaning device 1A. Path 96 is one example of a path along which self-position estimation is appropriately performed by cleaning device 1A.

In step S503, acquisition unit 21A acquires a third path. FIG. 25 shows one example of a third path acquired in step S503. To be more specific, (a), (b), and (c) in FIG. 25 respectively show path 102 forming the fourth path, path 104 forming the fifth path, and path 106 forming the sixth path, the fourth path, the fifth path, and the sixth path being included in the third path. End point 103 of path 102 also forms the start point of path 104. End point 105 of path 104 also forms the start point of path 106. Parameters "a", "b", and "c" which define a zigzag shaped path shown in FIG. 25 are decided to satisfy the following relationship (formula 4), for example.

[Math. 1]

$$b = a/\sqrt{2}$$

$$c = a/\sqrt{2} \quad \text{(formula 4)}$$

With respect to parameter "d" and parameter "e", reducing parameter "d" can reduce a region of a carpet which is treaded down by cleaning device 1A. On the other hand, increasing parameter "d" can reduce the number of times cleaning device 1A changes direction and hence, it is possible to increase the moving speed of cleaning device 1A.

Further, when the following relationship (formula 5) is satisfied, it is possible to obtain the advantageous effect of reducing an error in estimation of movement.

[Math. 2]

$$e/d \approx \sqrt{2} \quad \text{(formula 5)}$$

Further, increasing the value of e/d can reduce the number of times cleaning device 1A changes direction and hence, it is possible to increase the moving speed of cleaning device 1A. For example, d=b, and e=3/2×c may be established.

In FIG. 25, (d) shows the entire third path. In FIG. 25, (a) also shows peripheral edge portion 98. Path 91 is a path for thoroughly cleaning a movable region for cleaning device 1A. The third path is one example of a path generated independently from the above-mentioned path 91.

In step S504, selector 25 determines whether or not the number of times cleaning device 1A changes direction when cleaning device 1A moves along the second path is less than the number of times cleaning device 1A changes direction when cleaning device 1A moves along the third path by performing a magnitude comparison. When the number of times cleaning device 1A changes direction when cleaning device 1A moves along the second path is less than the number of times cleaning device 1A changes direction when cleaning device 1A moves along the third path (Yes in step S504), the processing advances to step S505. On the other hand, when the number of times cleaning device 1A changes direction when cleaning device 1A moves along the second path is not less than the number of times cleaning device 1A changes direction when cleaning device 1A moves along the third path (No in step S504), the processing advances to step S506.

In step S505, selector 25 selects the second path as the movement path of cleaning device 1A.

In step S506, selector 25 selects the third path as the movement path of cleaning device 1A.

In step S507, motor controller 24 drives motor 16 such that cleaning device 1A moves along the path selected from the second path and the third path by selector 25 in step S505 or step S506.

For example, the number of times cleaning device 1A changes direction along path 96, which is the second path, shown in (b) in FIG. 24 is 124. On the other hand, the number of times cleaning device 1A changes direction along a path, which is the third path, shown in (d) in FIG. 25 is 125. Accordingly, selector 25 selects the second path (Yes in step S504, step S505) and hence, cleaning device 1A moves along the second path.

As described above, the mobile robot which is the cleaning device of this embodiment moves along the third path generated independently from the second path. The second path generated by the mobile robot may have problems depending on the shape of the region where the mobile robot is capable of moving. The problem may be that a large amount of time is required for movement of the mobile robot, or that the second path has a large amount of overlapping portions. In such a case, the mobile robot moves along the third path generated independently from the second path and hence, the above-mentioned problem may be avoided.

Further, the mobile robot can select either one of the second path or the third path which requires less time for movement by comparing the second path and the third path with each other. Accordingly, the mobile robot can reduce time required for movement. At the same time, the mobile robot can move along a more appropriate movement path due to appropriate self-position estimation.

In the above-mentioned respective Embodiments, the respective constitutional elements may be formed of a dedicated hardware, or may be achieved by executing a software program suitable for the respective constitutional elements. The respective constitutional elements may be achieved such that a program execution unit, such as a CPU or a processor, reads out and executes a software program recorded in a recording medium, such as a hard disk or a semiconductor memory. Software which achieves the cleaning devices of the above-mentioned respective Embodiments is the following program.

That is, this program causes a computer to execute a method for controlling a mobile robot which moves in an environment and which includes a range finding sensor. The method includes: acquiring a map of the environment as viewed from above and a first path, the map including position information of an object, the first path being a path along which the mobile robot is to move in the environment; identifying a partial path forming a portion of the first path; converting the partial path identified into a path having a shape different from a shape of the partial path, to generate a second path; and causing the mobile robot to move along the second path. In performing identification, a region where range finding is performable by the range finding sensor from both of the start point and the end point of the portion of the first path is set on the map, and the portion is identified as the partial path when only one or more straight lines are represented as the object which is present in the region set, the one or more straight lines traversing the region and being parallel to a line segment directed to the end point from the start point.

Further, this program causes a computer to execute a method for controlling a mobile robot which moves in an environment, and which includes a range finding sensor. The method includes, in causing the mobile robot to move along a movement path parallel to a planar portion in a vicinity of a wall having the planar portion and an end edge portion, the steps of: (a) causing the mobile robot to move parallel to the planar portion when the planar portion and the end edge portion are present in a region where range finding is performable by the range finding sensor; and (b) causing the mobile robot to move along a zigzag shaped movement path converted from the movement path when only the planar portion from the planar portion and the end edge portion is present in the region where range finding is performable by the range finding sensor.

The cleaning devices according to one or a plurality of aspects have been described heretofore based on the embodiments. However, the present disclosure is not limited to these embodiments. Embodiments obtained by performing various modifications conceived by those skilled in the art on the embodiment of the present disclosure and embodiments obtained by combining the constitutional elements in different embodiments may also fall within the scope of the one or the plurality of aspects without departing from the gist of the present disclosure.

INDUSTRIAL APPLICABILITY

The present disclosure can be used as a mobile robot which can move along a more appropriate movement path.

What is claimed is:

1. A mobile robot which moves in an environment, the mobile robot comprising:
    a range finding sensor;
    an acquisition unit which acquires a map of the environment as viewed from above and a first path, the map including position information of an object, the first path being a path along which the mobile robot is to move in the environment;
    an identification unit which identifies a partial path forming a portion of the first path;
    a converter which converts the partial path, identified by the identification unit, into a path having a shape different from a shape of the partial path, to generate a second path; and
    a drive unit which causes the mobile robot to move along the second path, wherein
    the identification unit:
    sets a region, on the map, where range finding is performable by the range finding sensor from both of a start point and an end point of the portion of the first path; and
    identifies the portion as the partial path when only one or more straight lines are represented as the object which is present in the region set, the one or more straight lines traversing the region and being parallel to a line segment directed to the end point from the start point.

2. The mobile robot according to claim 1, wherein the second path is a path which connects a start point and an end point of the partial path, and which includes no straight line portion parallel to the line segment.

3. The mobile robot according to claim 2, wherein the second path is a path which connects the start point and the end point of the partial path in a zigzag manner.

4. The mobile robot according to claim 1, wherein in identifying the partial path to be converted by the converter, the identification unit:

sets, for each partial path forming the first path, a plurality of imaginary straight lines parallel to a straight line which connects a start point and an end point of the partial path at predetermined intervals in the region with respect to the partial path; and
identifies the partial path as the partial path to be converted by the converter when, with respect to each of the plurality of imaginary straight lines, the map shows that an object is present at all points on the imaginary straight line, or the map shows that no object is present on any of points on the imaginary straight line.

5. The mobile robot according to claim 1, wherein
the acquisition unit further acquires a third path generated based on the map,
the drive unit further causes the mobile robot to move along the third path, and
the third path includes (a) a fourth path along which the mobile robot is to move in a zigzag manner from a start point of the third path along a peripheral edge portion of a movable region on the map where the mobile robot is capable of moving, (b) a fifth path along which the mobile robot is to move in a zigzag manner from an end point of the fourth path along a portion of the movable region excluding the peripheral edge portion, and (c) a sixth path along which the mobile robot is to move in a zigzag manner from an end point of the fifth path to an end point of the third path.

6. The mobile robot according to claim 5, further comprising:
    a selector which compares a total number of times the mobile robot changes direction when the mobile robot travels along the second path and a total number of times the mobile robot changes direction when the mobile robot travels along the third path to select one of the second path and the third path where a total number of times the mobile robot changes direction is fewer, wherein
    the drive unit causes the mobile robot to move along the one of the second path and the third path selected by the selector.

7. A mobile robot which moves in an environment, the mobile robot comprising:
    a range finding sensor; and
    a drive unit which causes the mobile robot to move, wherein
    in causing the mobile robot to move along a movement path parallel to a planar portion in a vicinity of a wall having the planar portion and an end edge portion, the drive unit:
    (a) causes the mobile robot to move parallel to the planar portion when the planar portion and the end edge portion are present in a region where range finding is performable by the range finding sensor, and
    (b) causes the mobile robot to move along a zigzag shaped movement path converted from the movement path when only the planar portion from the planar portion and the end edge portion is present in the region where range finding is performable by the range finding sensor.

8. A method for controlling a mobile robot which moves in an environment and includes a range finding sensor, the method comprising:
    acquiring a map of the environment as viewed from above and a first path, the map including position information of an object, the first path being a path along which the mobile robot is to move in the environment;

identifying a partial path forming a portion of the first path;

converting the partial path identified into a path having a shape different from a shape of the partial path, to generate a second path; and causing the mobile robot to move along the second path, wherein in the identifying, a region where range finding is performable by the range finding sensor from both of a start point and an end point of the portion of the first path is set on the map, and the portion is identified as the partial path when only one or more straight lines are represented as the object which is present in the region set, the one or more straight lines traversing the region and being parallel to a line segment directed to the end point from the start point.

9. A method for controlling a mobile robot which moves in an environment and includes a range finding sensor, the method comprising, in causing the mobile robot to move along a movement path parallel to a planar portion in a vicinity of a wall having the planar portion and an end edge portion:

(a) causing the mobile robot to move parallel to the planar portion when the planar portion and the end edge portion are present in a region where range finding is performable by the range finding sensor; and (b) causing the mobile robot to move along a zigzag shaped movement path converted from the movement path when only the planar portion from the planar portion and the end edge portion is present in the region where range finding is performable by the range finding sensor.

* * * * *